(12) United States Patent  
Zhang et al.

(10) Patent No.: US 12,354,385 B2  
(45) Date of Patent: Jul. 8, 2025

(54) IMAGE PROCESSING METHOD AND APPARATUS, ELECTRONIC DEVICE, AND COMPUTER-READABLE STORAGE MEDIUM FOR IDENTIFYING TWO-DIMENSIONAL SHAPES USING A DEPTH IMAGE

(71) Applicant: Tencent Technology (Shenzhen) Company Limited, Shenzhen (CN)

(72) Inventors: Shenghao Zhang, Shenzhen (CN); Yonggen Ling, Shenzhen (CN); Wanchao Chi, Shenzhen (CN); Yu Zheng, Shenzhen (CN); Xinyang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 398 days.

(21) Appl. No.: 17/901,704

(22) Filed: Sep. 1, 2022

(65) Prior Publication Data

US 2022/0415064 A1 Dec. 29, 2022

Related U.S. Application Data

(63) Continuation of application No. PCT/CN2021/102741, filed on Jun. 28, 2021.

(30) Foreign Application Priority Data

Aug. 17, 2020 (CN) .......................... 202010825936.3

(51) Int. Cl.  
*G06V 20/64* (2022.01)  
*G06T 7/564* (2017.01)  
(Continued)

(52) U.S. Cl.  
CPC ............ *G06V 20/653* (2022.01); *G06T 7/564* (2017.01); *G06T 7/62* (2017.01); *G06T 7/70* (2017.01);  
(Continued)

(58) Field of Classification Search  
CPC ..................... G06T 7/70; G06T 7/0008; G06T 2207/10028; G06T 2207/30244;  
(Continued)

(56) References Cited

U.S. PATENT DOCUMENTS 10,671,835 B2 * 6/2020 Zou ........................... G06T 7/74  
2013/0114861 A1 5/2013 Takizawa  
(Continued)

FOREIGN PATENT DOCUMENTS

CN 101499132 A 8/2009  
CN 102316337 A 1/2012  
(Continued)

OTHER PUBLICATIONS

Bochkarev, Sergey O., Igor B. Litus, and Natalia S. Kravchenko. "Irregular objects. shape detection and characteristic sizes." Proceedings of the 1st International Workshop on Radio Electronics and Information Technologies. vol. 1. No. 2. 2017. (Year: 2017)*

(Continued)

*Primary Examiner* — Sumati Lefkowitz  
*Assistant Examiner* — Connor L Hansen  
(74) *Attorney, Agent, or Firm* — Morgan, Lewis & Bockius LLP

(57) ABSTRACT

The present disclosure provides an image processing method and apparatus, an electronic device, and a computer-readable storage medium. The method includes: obtaining a first three-dimensional image of a target object in a three-dimensional coordinate system; determining a target plane of the target object in the first three-dimensional image, the target (Continued)

plane comprising target three-dimensional points; projecting the target three-dimensional points to a two-dimensional coordinate system defined on the target plane, to obtain target two-dimensional points; determining a target polygon and a minimum circumscribed target graphic of the target polygon according to the target two-dimensional points; and recognizing the minimum circumscribed target graphic as a first target graphic of the target object in the first target three-dimensional image.

19 Claims, 14 Drawing Sheets

(51) Int. Cl.
　　*G06T 7/62*　　(2017.01)
　　*G06T 7/70*　　(2017.01)
　　*G06T 11/00*　(2006.01)
(52) U.S. Cl.
　　CPC .. *G06T 11/003* (2013.01); *G06T 2207/10028* (2013.01)
(58) Field of Classification Search
　　CPC ....... G06T 2200/04; G06T 3/06; G06T 7/564; G06T 7/62; G06T 11/003; G06T 7/50; G06V 2201/06; G06V 20/653; G06V 20/64; G06V 20/647; G06V 10/245; G06V 10/44
　　See application file for complete search history.

(56) References Cited

U.S. PATENT DOCUMENTS

| | | |
|---|---|---|
| 2019/0272411 A1 | 9/2019 | Zou et al. |
| 2019/0278288 A1 | 9/2019 | Xiong et al. |
| 2020/0198149 A1 | 6/2020 | Jiang et al. |

FOREIGN PATENT DOCUMENTS

| | | | |
|---|---|---|---|
| CN | 105844631 A | 8/2016 | |
| CN | 106204540 A | 12/2016 | |
| CN | 106780617 A | 5/2017 | |
| CN | 107194954 A | 9/2017 | |
| CN | 109242874 A | 1/2019 | |
| CN | 110012182 A | 7/2019 | |
| CN | 110135278 A | 8/2019 | |
| CN | 110942476 A | 3/2020 | |
| CN | 111065048 A | 4/2020 | |
| CN | 112052847 A | 12/2020 | |
| WO | WO-2019053468 A1 * | 3/2019 | ........... G06T 7/0004 |

OTHER PUBLICATIONS

Fu, Tianyu, et al. "Dynamically grasping with incomplete information workpiece based on machine vision." 2019 IEEE International Conference on Unmanned Systems (ICUS). IEEE, 2019. (Year: 2019)*
Tencent Technology, ISR, PCT/CN2021/102741, Sep. 29, 2021, 2 pgs.
Sergey O. Bochkarev et al., "Irregular Objects. Shape Detection and Characteristic Sizes", Proceedings of the 1st International Workshop on Radio Electronics & Information Technologies, Mar. 15, 2017, XP093105354, 8 pgs.
Tencent Technology, Extended European Search Report and Supplementary Search Report, EP21857355.8, Dec. 6, 2023, 10 pgs.
Tencent Technology, WO, PCT/CN2021/102741, Sep. 29, 2021, 5 pgs.
Tencent Technology, IPRP, PCT/CN2021/102741, Feb. 16, 2023, 6 pgs.
Zhou et al., "A Method of Two Dimensional Otsu Image Threshold Segmentation Based on Improved Firefly Algorithm", The $5^{th}$ Annual IEEE International Conference on Cyber Technology in Automation, Control, and Intelligent Systems, Oct. 2015, https://ieeexplore.ieee.org/abstract/document/728815.
Yi et al., "Face Feature-Points Location Based on 3D Transform Shape Search", Journal of Computer Applications, vol. 30, No. 3, Mar. 2010, www.joca.en/EN/abstract/abstract12689.shtml.

* cited by examiner

IMAGE PROCESSING METHOD AND APPARATUS, ELECTRONIC DEVICE, AND COMPUTER-READABLE STORAGE MEDIUM FOR IDENTIFYING TWO-DIMENSIONAL SHAPES USING A DEPTH IMAGE

CROSS-REFERENCE TO RELATED APPLICATIONS

This application is a continuation application of PCT Patent Application No. PCT/CN2021/102741, entitled "IMAGE PROCESSING METHOD AND APPARATUS, ELECTRONIC DEVICE, AND COMPUTER READABLE STORAGE MEDIUM" filed on Jun. 28, 2021, which claims priority to Chinese Patent Application No. 202010825936.3, filed with the State Intellectual Property Office of the People's Republic of China on Aug. 17, 2020, and entitled "Image processing method and device, electronic equipment and computer readable storage medium", all of which are incorporated herein by reference in their entirety.

FIELD OF THE TECHNOLOGY

The present disclosure relates to the field of image processing technologies, and in particular, to an image processing method and apparatus, an electronic device, and a computer-readable storage medium.

BACKGROUND OF THE DISCLOSURE

Target recognition and localization are very important basic research in the field of artificial intelligence and machine vision, whose research goal is to perceive an environment and recognize an object in the environment by using image information, video information, or spatial information, for example, perform image capture and recognition on a to-be-grasped target cylinder in a target pipeline, so that a target mechanical arm can grasp the target cylinder; or in another example, perform image capture and recognition on a circular plum-blossom pile on which a legged robot is about to land, to control a foothold of the legged robot during movement of the legged robot.

In the related art, a to-be-recognized target may not be accurately recognized due to an angle of image capture, a color of the photographed target, or the like.

SUMMARY

According to embodiments of this application, an image processing method and apparatus, an electronic device, and a computer-readable storage medium are provided.

An image processing method is provided. The method includes: obtaining a first three-dimensional image of a target object in a three-dimensional coordinate system; determining a target plane of the target object in the first three-dimensional image, the target plane comprising target three-dimensional points in the three-dimensional coordinate system; projecting the target three-dimensional points to a two-dimensional coordinate system defined on the target plane, to obtain target two-dimensional points in the two-dimensional coordinate system; determining a target polygon and a minimum circumscribed target graphic of the target polygon in the two-dimensional coordinate system according to the target two-dimensional points; and recognizing the minimum circumscribed target graphic as a first target graphic of the target object in the first target three-dimensional image.

An image processing apparatus is provided. The image processing apparatus includes: a first three-dimensional image obtaining module, a target plane obtaining module, a target two-dimensional point obtaining module, a minimum circumscribed target graphic determining module, and a first target graphic determining module.

The first target three-dimensional image obtaining module may be configured to obtaining a first three-dimensional image of a target object in a three-dimensional coordinate system. The target plane obtaining module may be configured to determine a target plane of the target object in the first three-dimensional image, the target plane comprising target three-dimensional points in the three-dimensional coordinate system. The target two-dimensional point obtaining module may be configured to project the target three-dimensional points to a two-dimensional coordinate system defined on the target plane, to obtain target two-dimensional points in the two-dimensional coordinate system. The minimum circumscribed target graphic determining module may be configured to determine a target polygon and a minimum circumscribed target graphic of the target polygon in the two-dimensional coordinate system according to the target two-dimensional points. The first target graphic determining module may be configured to recognize the minimum circumscribed target graphic as a first target graphic of the target object in the first target three-dimensional image.

In some embodiments, the minimum circumscribed target graphic is a target minimum circumscribed circle, and the first target graphic is a first target circle.

In some embodiments, the image processing apparatus may include: a first target center obtaining unit and a first center coordinate value obtaining unit.

The first target center obtaining unit may be configured to obtain a first target center of the target minimum circumscribed circle in the target two-dimensional coordinate system. The first center coordinate value obtaining unit may be configured to map the first target center from the two-dimensional coordinate system to the three-dimensional coordinate system, to obtain a target coordinate value of the first target center in the target three-dimensional coordinate system, the target coordinate value being a first center coordinate value of the first target circle in the three-dimensional coordinate system; and determine a radius of the first target circle in the three-dimensional coordinate system according to the first center coordinate value and a coordinate value of a three-dimensional contour point of the first target circle.

In some embodiments, the first center coordinate value obtaining unit may include: a three-dimensional start point obtaining subunit, a two-dimensional start point obtaining subunit, a target distance obtaining subunit, a two-dimensional search point obtaining subunit, and a target coordinate value obtaining subunit.

The three-dimensional start point obtaining subunit may be configured to determine a three-dimensional start point in the target three-dimensional points. The two-dimensional start point obtaining subunit may be configured to map the three-dimensional start point from the three-dimensional coordinate system to the two-dimensional coordinate system, to obtain a two-dimensional start point. The target distance obtaining subunit may be configured to obtain a target distance between the two-dimensional start point and the first target center. The two-dimensional search point obtaining subunit may be configured to use a target three-dimensional point adjacent to the three-dimensional start point as a three-dimensional search point, and map the three-dimensional search point to the target two-dimensional coordinate system to obtain a two-dimensional search point. The target coordinate value obtaining subunit may be configured to use a coordinate value of the three-dimensional start point as the target coordinate value when a distance between each two-dimensional search point and the first target center is greater than or equal to the target distance.

In some embodiments, the first center coordinate value obtaining unit may further include: a target two-dimensional search point obtaining subunit, a three-dimensional start point update subunit, two-dimensional start point update subunit, and a three-dimensional search point update subunit.

The target two-dimensional search point obtaining subunit may be configured to determine, when there are two-dimensional search points whose distances to the first target center are less than the target distance, a target two-dimensional search point that has a minimum distance to the first target center in the two-dimensional search points. The three-dimensional start point update subunit may be configured to update the target distance by using the distance between the target two-dimensional search point and the first target center, and update the three-dimensional start point by using a three-dimensional search point corresponding to the target two-dimensional search point. The two-dimensional start point update subunit may be configured to map an updated three-dimensional start point to the target two-dimensional coordinate system, to update the two-dimensional start point. The three-dimensional search point update subunit may be configured to update the three-dimensional search point by using a target three-dimensional point adjacent to the updated three-dimensional start point, and map an updated three-dimensional search point from the three-dimensional coordinate system to the two-dimensional coordinate system to update the two-dimensional search point.

In some embodiments, the target two-dimensional point obtaining module may include: a three-dimensional contour point determining unit and a two-dimensional contour point determining unit.

The three-dimensional contour point determining unit may be configured to determine target three-dimensional contour points of the target plane in the target three-dimensional points. The two-dimensional contour point determining unit may be configured to project the target three-dimensional contour points from the three-dimensional coordinate system to the two-dimensional coordinate system, to obtain target two-dimensional contour points, so as to determine the target polygon according to the target two-dimensional contour points.

In some embodiments, the image processing apparatus may further include: a second target three-dimensional image obtaining module, a second target circle obtaining module, a first distance determining module, a second distance determining module, and a target center coordinate value determining module.

The second target three-dimensional image obtaining module may be configured to obtain a second target three-dimensional image in the target three-dimensional coordinate system, the first target three-dimensional image and the second target three-dimensional image both including a target object, and the target object including a target circular plane. The second target circle obtaining module may be configured to determine a second target circle and a second center coordinate value of a second target center of the second target circle in the second target three-dimensional image. The first distance determining module may be configured to determine a first distance between the first target center and an image capture device that captures the first target three-dimensional image. The second distance determining module may be configured to determine a second distance between the second target center and an image capture device that captures the second target three-dimensional image. The target center coordinate value determining module may be configured to determine a target center coordinate value of the target circular plane of the target object according to the first distance, the second distance, the first target center coordinate value, and the second target center coordinate value.

In some embodiments, the image processing apparatus may further include: a radius obtaining module and a target radius determining module.

The radius obtaining module may be configured to determine a first radius of the first target circle and a second radius of the second target circle. The target radius determining module may be configured to determine a target radius of the target circular plane according to the first distance, the second distance, the first radius, and the second radius.

In some embodiments, the first center coordinate value obtaining unit may include: a mapped point obtaining unit, a distance obtaining subunit, and a target coordinate value obtaining subunit.

The mapped point obtaining unit may be configured to map the first target center from the two-dimensional coordinate system to the three-dimensional coordinate system, to obtain a target mapped point and a coordinate value of the target mapped point. The distance obtaining subunit may be configured to obtain a distance between the target mapped point and each three-dimensional contour point of the first target circle. The target coordinate value obtaining subunit may be configured to use the coordinate value of the target mapped point as the target coordinate value of the first target center in the target three-dimensional coordinate system when the distance between each three-dimensional contour point of the first target circle and the target mapped point falls within a target range.

In some embodiments, the image processing apparatus may further include: a first normal determining module, a first radius obtaining module, and a robot control module.

The first normal determining module may be configured to determine a normal of the first target circle. The first radius obtaining module may be configured to determine a first radius of the first target circle according to a target three-dimensional contour point of the first target circle and the first target center. The robot control module may be configured to generate control information according to the first center coordinate value, the first radius, and the normal of the first target circle, the control information being used for controlling a center of gravity of a foot of a target robot to coincide with the first center coordinate value of the first target circle.

In some embodiments, the first target three-dimensional image is captured from a target circular plane of a target cylinder.

In some embodiments, the image processing apparatus may include: a second normal determining module, a second radius obtaining module, and a mechanical arm control module.

The second normal determining module may be configured to determine a normal of the first target circle. The second radius obtaining module may be configured to determine a radius of the first target circle according to a target three-dimensional contour point of the first target circle and the first target center. The mechanical arm control module may be configured to control, according to the first center coordinate value, the radius, and the normal of the first target circle and a height of the target cylinder, a target mechanical arm to grasp the target cylinder.

In some embodiments, the first target three-dimensional image is obtained by using a target depth image.

In some embodiments, the first target three-dimensional image obtaining module may include: a target depth image obtaining unit, a pose matrix obtaining unit, and a first target three-dimensional image obtaining unit.

The target depth image obtaining unit may be configured to obtain the target depth image, the target depth image being obtained by using a first image capture device. The pose matrix obtaining unit may be configured to obtain a pose matrix of the first image capture device in the target three-dimensional coordinate system. The first target three-dimensional image obtaining unit may be configured to perform coordinate transformation on the target depth image according to the pose matrix of the first image capture device, to obtain the first target three-dimensional image.

An electronic device is provided. The electronic device includes: one or more processors; and a storage apparatus, configured to store one or more programs, the one or more programs, when executed by the one or more processor, causing the one or more processors to implement the foregoing image processing method.

A computer-readable storage medium is provided. The computer-readable storage medium stores a computer program, the computer program, when executed by a processor, implementing the foregoing image processing method.

A computer program product or a computer program is provided. The computer program product or the computer program includes a computer instruction, the computer instruction being stored in a computer-readable storage medium. A processor of a computer device reads the computer instruction from the computer-readable storage medium, and the processor executes the computer instruction, to cause the computer device to execute the foregoing image processing method.

Details of one or more embodiments of this application are provided in the accompanying drawings and descriptions below. Other features and advantages of this application become more obvious with reference to the specification, the accompanying drawings, and the claims.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. The accompanying drawings in the following description are merely some embodiments of the present disclosure, and a person of ordinary skill in the art may still derive other accompanying drawings from these accompanying drawings without creative efforts.

DESCRIPTION OF EMBODIMENTS

Figure 1:
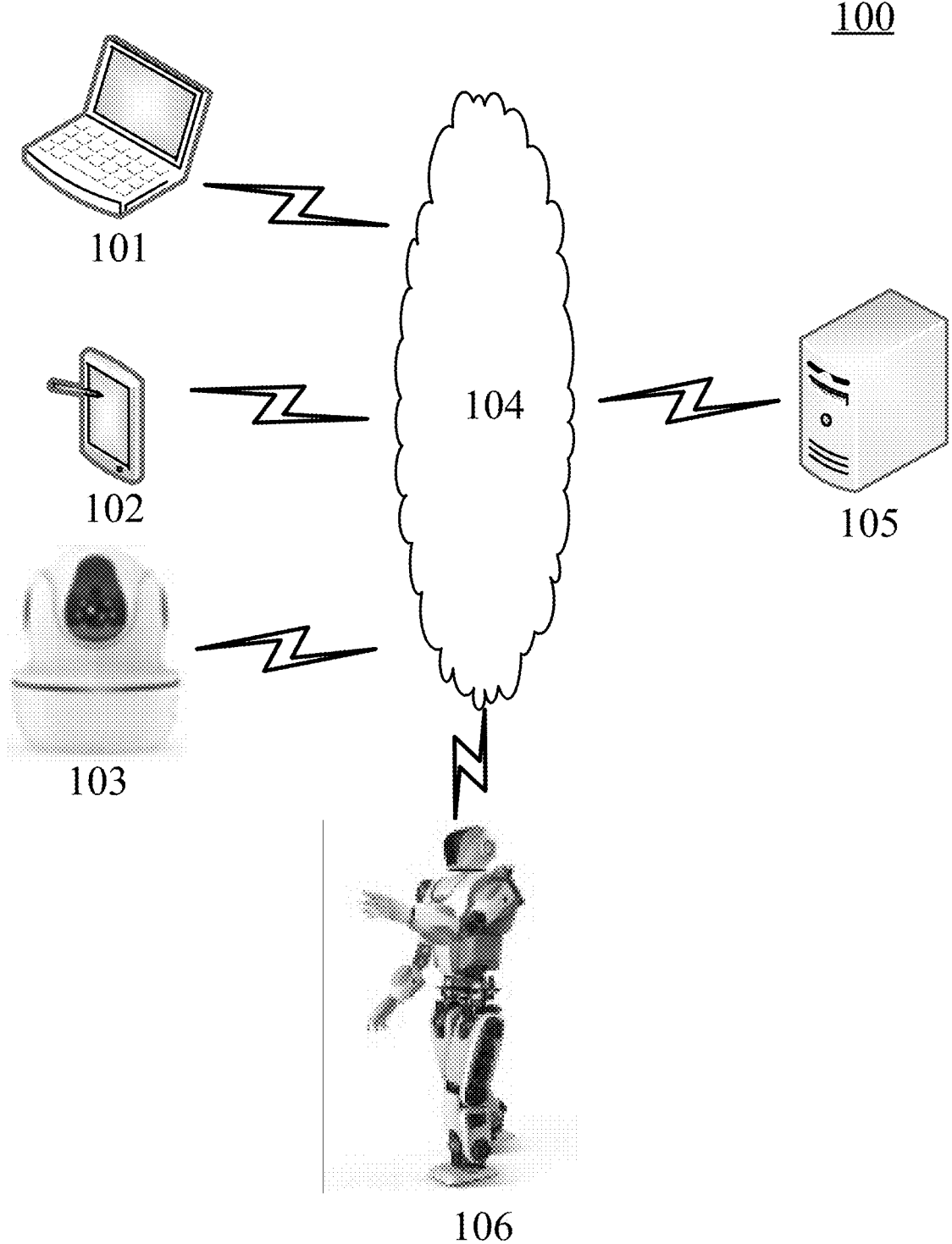
FIG. 1 is a schematic diagram of an exemplary system architecture applied to an image processing method or an image processing apparatus according to an embodiment of the present disclosure.

At present, the exemplary embodiments are described comprehensively with reference to the accompanying drawings. However, the exemplary embodiments can be implemented in a plurality of forms, and it is not to be understood as being limited to the embodiments described herein. Conversely, the embodiments are provided to make the present disclosure more comprehensive and complete, and comprehensively convey the idea of the examples of the embodiments to a person skilled in the art. A same reference numeral in the accompanying drawings represents same or similar components, and therefore repeated descriptions of the components are appropriately omitted.

The features, structures, or characteristics described in the present disclosure may be combined in one or more implementations in any suitable manner. In the following descriptions, a lot of specific details are provided to give a comprehensive understanding of the implementations of the present disclosure. However, a person skilled in the art is to be aware that, the technical solutions in the present disclosure may be implemented without one or more of the particular details, or another method, component, apparatus, or step may be used. In other cases, well-known methods, apparatuses, implementations, or operations are not shown or described in detail, to avoid obscuring aspects of the present disclosure.

The accompanying drawings are merely exemplary illustrations of the present disclosure, the same reference numbers in the accompanying drawings represent the same or similar parts, and therefore, repeated descriptions thereof are omitted. Some of the block diagrams shown in the accompanying drawings do not necessarily correspond to physically or logically independent entities. Such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not need to include all content and steps, and do not need to be performed in the described orders either. For example, some steps may further be decomposed, and some steps may be merged or partially merged. As a result, an actual execution order may be changed according to an actual situation.

In this specification, the terms "a", "an", "the", and "at least one" are used for indicating presence of one or more elements, components, or the like. The terms "comprising", "including", and "having" are used for indicating an open-ended inclusive meaning and referring to possible presence of additional elements, components, or the like in addition to the listed elements, components, or the like. The terms "first," "second", "third", and the like are used only as labels and are not intended to limit the number of objects thereof.

The following describes the exemplary implementations of the present disclosure in detail with reference to the accompanying drawings.

FIG. 1 is a schematic diagram of an exemplary system architecture that may be applied to an image processing method or an image processing apparatus according to an embodiment of the present disclosure.

As shown in FIG. 1, the system architecture 100 may include terminal devices 101 and 102, an image capture device 103, a network 104, a server 105, and a target robot 106. The image capture device 103 or the terminal device 101 may be configured to capture a first target three-dimensional image. The network 104 may be configured as a medium to provide a communication link between the terminal device 101 (or 102), the image capture device 103, the server 105, and the target robot 106. The network 104 may include various connection types, such as a wired or wireless communication link, or a fiber optic cable.

A user may use the terminal device 101 or 102 to interact with the server 105 through the network 104 to receive or send a message or the like, and the user may also use the image capture device 103 to exchange information with the server 105 or the terminal device 101 or 102 through the network. The terminal devices 101 and 102 may be various electronic devices with a display screen and supporting web browsing, including but not limited to smart phones, tablet computers, laptop computers, desktop computers, wearable devices, virtual reality devices, smart homes, and the like.

The server 105 may be a server that provides various services, for example, a background management server that provides support for an apparatus operated by the user using the terminal device; or in another example, a background service manager that provides support for a moving operation of the target robot. The background management server may perform processing such as analysis on data such as a request received from the terminal device or the image capture device, and send a processing result to the target robot 106, to control the target robot to move.

The server 105 may, for example, obtain a first target three-dimensional image in a target three-dimensional coordinate system by using the terminal device 101 (or 102) or the image capture device 103. The server 105 may, for example, determine target planes in the first target three-dimensional image, the target plane including target three-dimensional points. The server 105 may, for example, project the target three-dimensional points to a target two-dimensional coordinate system in which the target plane is located, to obtain target two-dimensional points. The server 105 may, for example, determine a target polygon and a minimum circumscribed target graphic of the target polygon according to the target two-dimensional points. The server 105 may, for example, recognize the minimum circumscribed target graphic as a first target graphic of the target object in the first target three-dimensional image. The server 105 may, for example, control, according to the first target graphic, the target robot 106 to move.

It is to be understood that the numbers of terminal devices, target robots, networks, and servers in FIG. 1 are only exemplary, the server 105 may be an entity server, or may include a plurality of servers, and any numbers of terminal devices, networks, and servers may be used as actually required.

Figure 2:
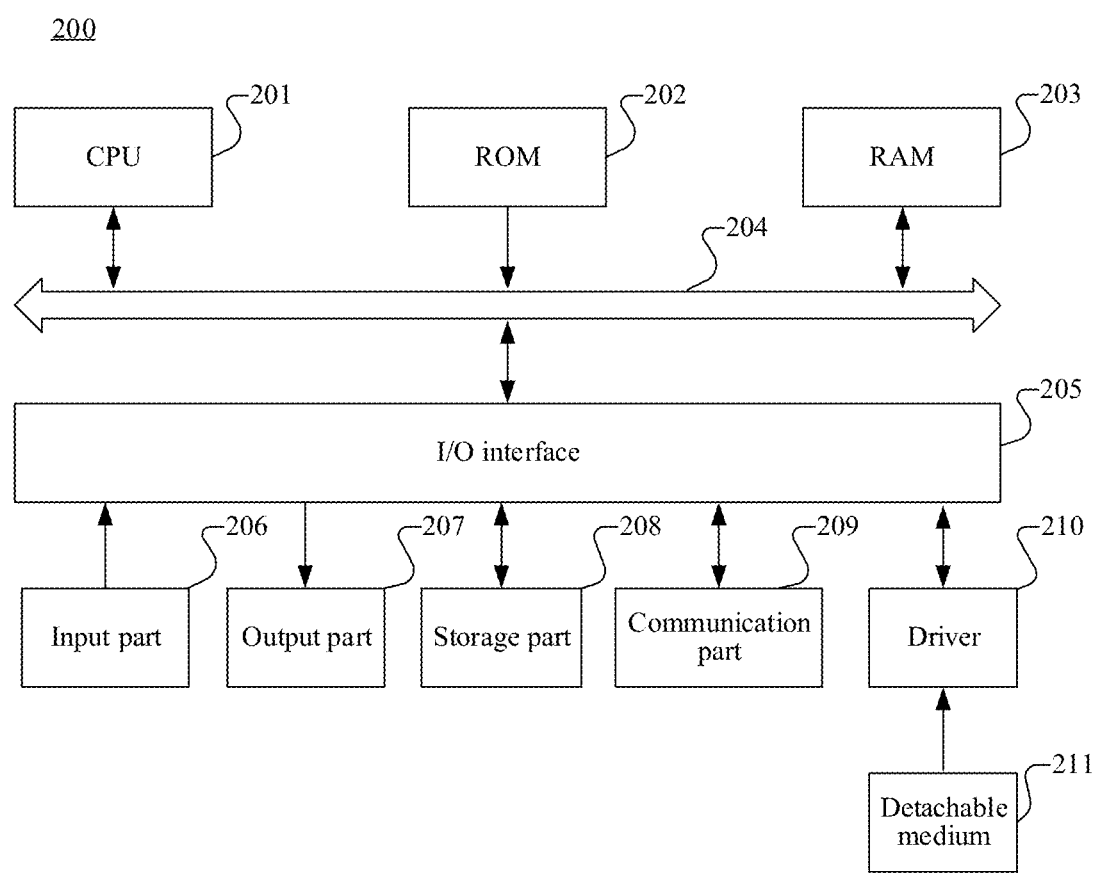
FIG. 2 is a schematic structural diagram of a computer system applied to an image processing apparatus according to an exemplary embodiment.

Next, FIG. 2 is a schematic structural diagram of a computer system 200 applicable to implementing a terminal device according to an embodiment of this application. The terminal device shown in FIG. 2 is merely an example, and is not to impose any limitation on a function and use scope of the embodiments of this application.

As shown in FIG. 2, the computer system 200 includes a central processing unit (CPU) 201. The CPU 201 can perform various appropriate actions and processing according to a program stored in a read-only memory (ROM) 202 or a program loaded into a random access memory (RAM) 203 from a storage part 208. The RAM 203 further stores various programs and data required for operations of the system 200. The CPU 201, the ROM 202, and the RAM 203 are connected to each other through a bus 204. An input/output (I/O) interface 205 is also connected to the bus 204.

The following components are connected to the I/O interface 205, which include an input part 206 such as a keyboard and a mouse; an output part 207 including a cathode ray tube (CRT), a liquid crystal display (LCD), and a speaker; a storage part 208 including a hard disk; and a communication part 209 including a network interface card such as an LAN card or a modem. The communication part 209 performs communication processing by using a network such as the Internet. A drive 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

In particular, according to the embodiments of the present disclosure, the processes described above with reference to the flowchart may be implemented as a computer software program. For example, the embodiments of the present disclosure include a computer program product, including a computer program carried on a computer-readable storage medium. The computer program includes program code for performing the methods shown in the flowcharts. In such an embodiment, the computer program may be downloaded and installed through the communication part 209 from a network, and/or installed from the removable medium 211. When the computer program is executed by the CPU 201, the above functions defined in the system of this application are performed.

The computer-readable storage medium in this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code contained in the computer-readable storage medium may be transmitted by using any appropriate medium, including but not limited to: a wireless medium, a wire, an optical cable, RF, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The modules and/or units and/or subunits involved in the description of the embodiments of this application may be implemented by software or hardware. Alternatively, the described modules and/or units and/or subunits may be disposed in a processor, for example, may be described as follows: a processor includes a sending unit, an obtaining unit, a determining unit, and a first processing unit. Names of the modules and/or units and/or subunits do not constitute a limitation on the modules and/or units and/or subunits in a specific case.

In addition, this application further provides a computer-readable storage medium. The computer-readable storage medium may be included in the device described in the foregoing embodiment, or may exist alone without being assembled into the device. The computer-readable storage medium carries one or more programs, the one or more programs, when executed by the device, causing the device to implement functions including: obtaining a first target three-dimensional image in a target three-dimensional coordinate system; determining target planes in the first target three-dimensional image, the target plane including target three-dimensional points; projecting the target three-dimensional points to a target two-dimensional coordinate system in which the target plane is located, to obtain target two-dimensional points; determining a target polygon and a minimum circumscribed target graphic of the target polygon according to the target two-dimensional points; and recognizing a target plane whose area ratio between a target polygon and a minimum circumscribed target graphic is greater than a target threshold as a first target graphic in the first target three-dimensional image, shapes of the first target graphic and the minimum circumscribed target graphic being consistent.

Figure 3:
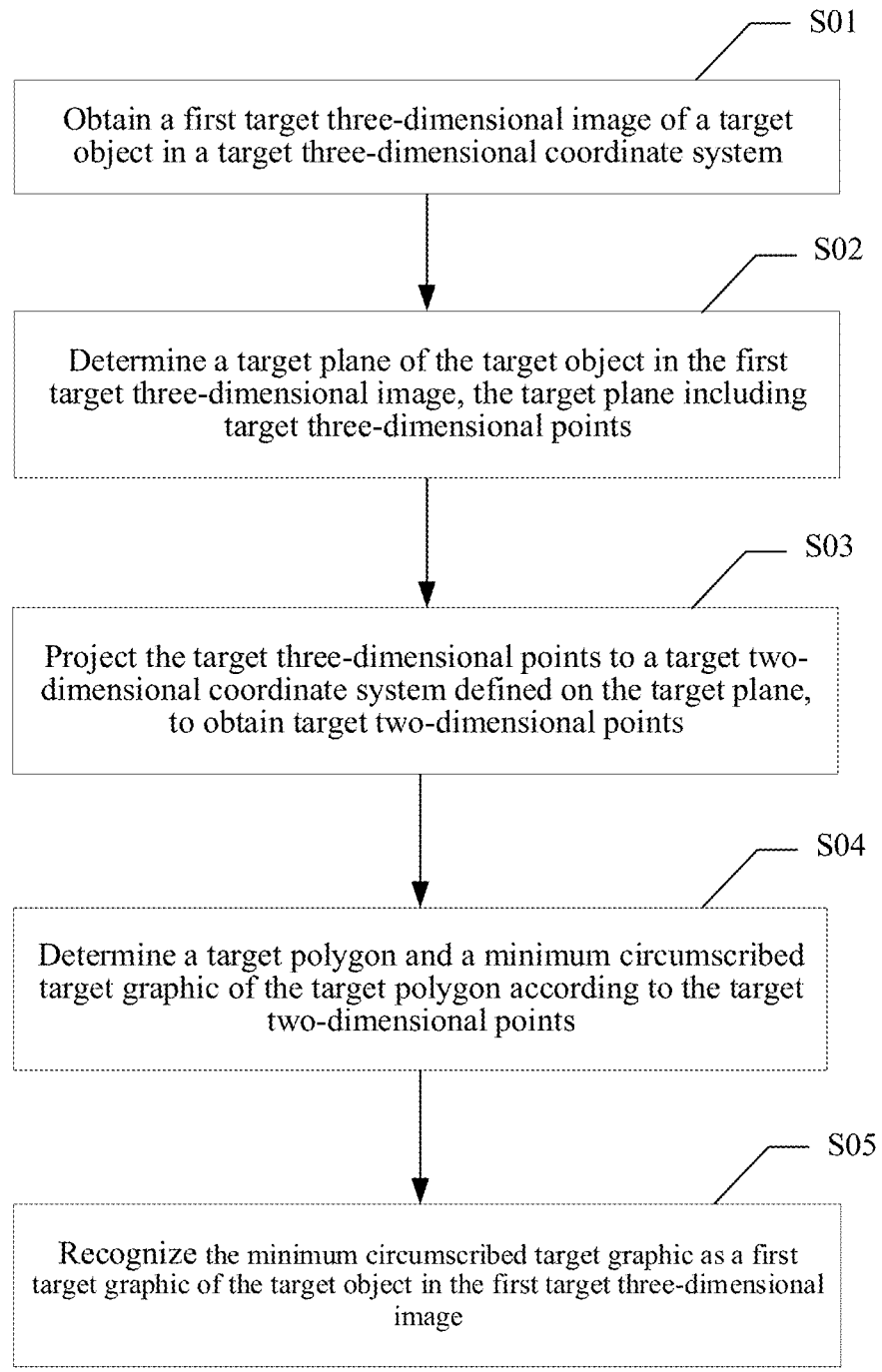
FIG. 3 is a flowchart of an image processing method according to an exemplary embodiment.

FIG. 3 is a flowchart of an image processing method according to an exemplary embodiment. The method provided in this embodiment of the present disclosure may be processed by any electronic device with a computing processing capability, for example, the server 105 and/or the terminal device 101 or 102 in the embodiment of FIG. 1. In the following embodiment, that the server 105 is an execution body is used as an example for illustration, but the present disclosure is not limited thereto.

Referring to FIG. 3, the image processing method provided in this embodiment of the present disclosure includes the following steps.

S01. Obtain a first target three-dimensional image of a target object in a target three-dimensional coordinate system.

In some embodiments, the first target three-dimensional image may be a three-dimensional image including a to-be-recognized target. The to-be-recognized target may be a to-be-recognized object (for example, a plum-blossom pile, a rectangular staircase, or a prism) in the first target three-dimensional image, or may be a to-be-recognized graphic (for example, a circular plane of a plum-blossom pile or a rectangular plane of a rectangular staircase) in the first target three-dimensional image, or the like, which is not limited in the present disclosure.

In some embodiments, first, a target scene including the to-be-recognized target may be photographed by using a target depth camera, to obtain a target depth image of the target scene. Then, the target depth image may be transformed into a three-dimensional image in the target three-dimensional coordinate system according to a pose matrix of the target depth camera in the target three-dimensional coordinate system, to obtain the first target three-dimensional image. The target depth camera may be an RGB-D camera (for example, a Kinect camera (a three-dimensional somatosensory camera)). The target three-dimensional coordinate system may be a world coordinate system or the like. This is not limited in the present disclosure. In addition, the pose matrix of the target depth camera may be obtained through simultaneous localization and mapping (SLAM), which is not limited in the present disclosure, either. SLAM is a real-time localization and mapping technology, which may be used to obtain in real time a three-dimensional pose of the target depth camera in the target three-dimensional coordinate system.

Figure 4:
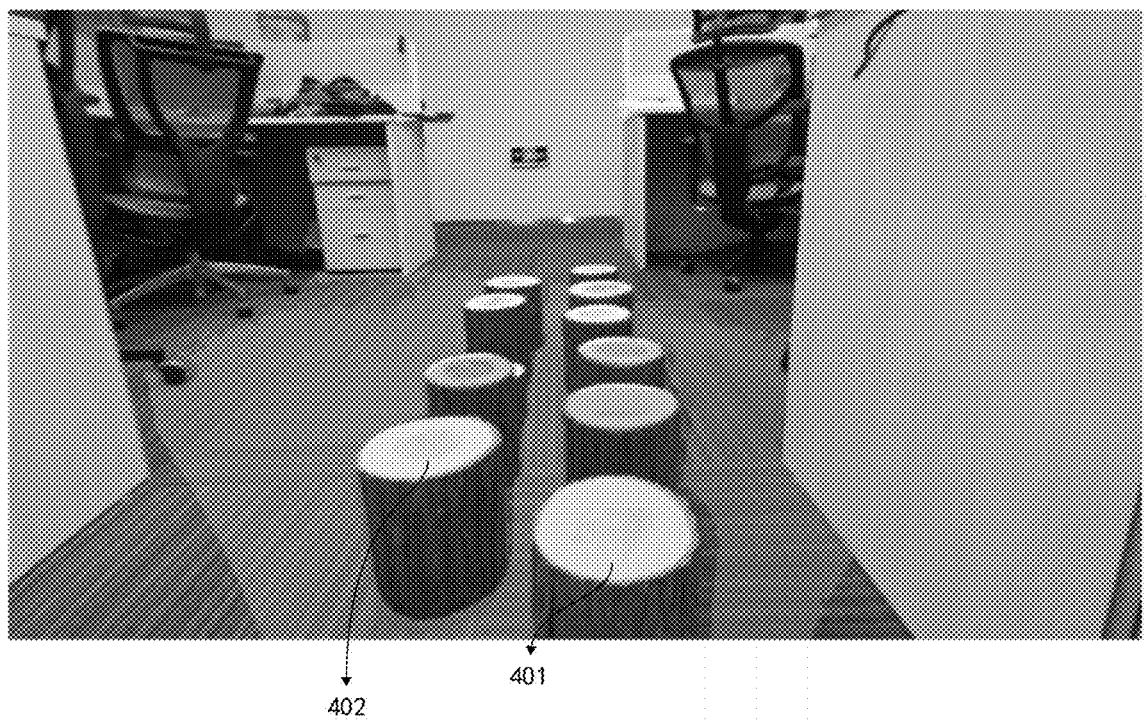
FIG. 4 is a schematic diagram of a first target three-dimensional image according to an exemplary embodiment.

For example, in a target scene in which a legged robot is controlled to walk on a plum-blossom pile, the target depth camera may be first used to perform image capture on a plum-blossom pile on which the legged robot is about to land, to obtain a target depth image shown in FIG. 4, and then the target depth image is processed according to a real-time three-dimensional pose of the target depth camera, to obtain a first target three-dimensional image in the target three-dimensional coordinate system.

S02. Determine a target plane of the target object in the first target three-dimensional image, the target plane including target three-dimensional points in the three-dimensional coordinate system.

The target depth image shown in FIG. 4 includes a to-be-recognized target circular plane 401 or 402, and may further include a table plane, a chair plane, and the like. Therefore, the first target three-dimensional image may include the to-be-recognized target circular plane, and may also include a recognition interference item such as the table plane or the chair plane.

To accurately recognize the to-be-recognized target from the first target three-dimensional image, first, all plane graphics (which may be referred to as target planes) in the first target three-dimensional image may be recognized by using a plane fitting technology. Then, the target planes may be screened, to determine a to-be-recognized first target graphic from the target planes.

In some embodiments, a plane including points (or three-dimensional points) with slight depth gradients in a local spatial domain range may be extracted from the target depth image (or the three-dimensional image including depth information) by using the plane fitting technology.

In the related art, a relatively classical plane fitting method is a region growing segmentation method. The region growing segmentation method may include the following steps: dividing the entire depth image (or three-dimensional image including depth information) according to a uniform grid to obtain a plurality of image blocks; fusing image blocks that are adjacent in a spatial domain, and using the fused adjacent image blocks as a new plane to re-solve a plane equation, there being two conditions for whether adjacent image blocks can be fused, a first condition being that a distance between a current image block and its adjacent image block needs to be less than a threshold, and a second condition being that a normal angle between the two adjacent image blocks is less than a threshold; and after a large plane is obtained, performing flood filling by using any point in the plane as a start point to refine a boundary. In principle, as long as a distance between a neighboring point in the spatial domain and the plane is less than a threshold, it indicates that the point belongs to the current plane.

A flood filling method is a method of filling a connected region in a specific manner (for example, using a specific color), which achieves different filling effects by setting upper and lower limits for connectable pixels and connection manners.

It may be understood that because the target depth image and the first target three-dimensional image may be transformed by using the pose matrix of the target depth camera, the first target three-dimensional image may also include the depth information of the image, and plane fitting on the target depth image may be plane fitting on the first target three-dimensional image. This is not limited in the present disclosure.

In some embodiments, the plane fitting technology may be used to not only recognize a target plane from the first target three-dimensional image, but also provide a plane equation and a normal direction of the target plane. Details are not described in the present disclosure.

S03. Project the target three-dimensional points to a target two-dimensional coordinate system defined on the target plane, to obtain target two-dimensional points in the two-dimensional coordinate system.

In some embodiments, after the target plane is recognized from the first target three-dimensional image, the target two-dimensional coordinate system may be constructed according to a plane in which the target plane is located. A method of constructing the target two-dimensional coordinate system is not limited in the present disclosure.

In some embodiments, the target three-dimensional points in the target plane may be projected to the target two-dimensional coordinate system in which the target plane is located, to obtain the target two-dimensional points of the target plane in the target two-dimensional coordinate system.

Because the target plane includes a large number of three-dimensional points, to save computing resources, target three-dimensional contour points of the target plane may be extracted from the target three-dimensional points, and then the target three-dimensional contour points are mapped to the target two-dimensional coordinate system, to obtain target two-dimensional contour points.

S04. Determine a target polygon and a minimum circumscribed target graphic of the target polygon in the two-dimensional coordinate system according to the target two-dimensional points.

In some embodiments, contours of the target two-dimensional points may be connected to generate the target polygon.

Figure 5:
FIG. 5 is a schematic diagram of a target polygon according to an exemplary embodiment.

In some other embodiments, the target two-dimensional contour points may be directly connected to generate the target polygon. Alternatively, the target three-dimensional contour points in the target three-dimensional points may be projected to the target two-dimensional coordinate system, to obtain target two-dimensional contour points shown by a dotted line in FIG. 5; and positions in the target two-dimensional contour points may be highlighted by using star marks shown in FIG. 5, and then the stars are connected to obtain the target polygon. This is not limited in the present disclosure.

In some embodiments, after the target polygon of the target plane in the target two-dimensional coordinate system is determined, the minimum circumscribed target graphic of the target polygon may be further obtained, shapes of the minimum circumscribed target graphic and the to-be-recognized first target graphic being consistent.

Figure 6:
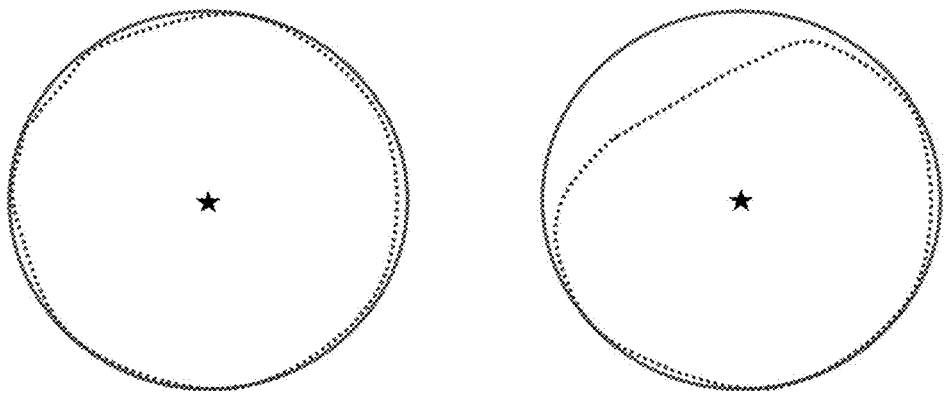
FIG. 6 is a schematic diagram of a target minimum circumscribed circle according to an exemplary embodiment.

In some embodiments, if the to-be-recognized first target graphic is a circle, it may be determined that a circumscribed circle (shown in FIG. 6) of the target polygon is used as the minimum circumscribed target graphic. If the to-be-recognized first target graphic is a square, it may be determined that a circumscribed square of the target polygon is used as the minimum circumscribed target graphic. If the to-be-recognized first target graphic is a rhombus, it may be determined that a circumscribed rhombus of the target polygon is used as the minimum circumscribed target graphic. This is not limited in the present disclosure.

S05. Recognize the minimum circumscribed target graphic as a first target graphic of the target object in the first target three-dimensional image.

In some embodiments, an area ratio between a target polygon and a minimum circumscribed target graphic may be obtained. If the area ratio is greater than the target threshold (for example, 0.8), it may be considered that a target plane corresponding to the target polygon is a to-be-recognized first target graphic in the first target three-dimensional image.

According to the technical solution provided in this embodiment, the first target graphic may be accurately recognized from the first target three-dimensional image, to perform an operation according to the first target graphic and the three-dimensional coordinate value of the first target graphic. For example, in a scene in which a legged robot is controlled to move on a plum-blossom pile, the first target graphic may be a circular plane of a plum-blossom pile on which the legged robot is about to land. After the circular plane of the to-be-landed-on plum-blossom pile and three-dimensional position coordinates of the circular plane are determined, the legged robot may be controlled to land according to the circular plane and the three-dimensional position coordinates of the circular plane. In another example, in a scene in which a mechanical arm grasps a target cylinder, the first target graphic may be a circular plane of the target cylinder. After the circular plane of the target cylinder and three-dimensional position information of the circular plane are determined, the mechanical arm may be controlled to grasp the target cylinder according to a position of the circular plane of the target cylinder and information (which may be known) such as a height of the target cylinder.

In some embodiments, height information of the target cylinder may be known in advance. For example, in a situation of grasping a cylindrical ring-pull can in a pipeline, height information of the ring-pull can may be known before the grasping. In some other embodiments, height information of the target cylinder may be calculated according to three-dimensional information of the first target graphic. For example, assuming that the target cylinder stands on a table, the table may be first recognized from the first target three-dimensional image and three-dimensional information of the table is obtained. Then, the height information of the target cylinder may be determined according to the first target graphic and the three-dimensional information of the table.

Figure 7:
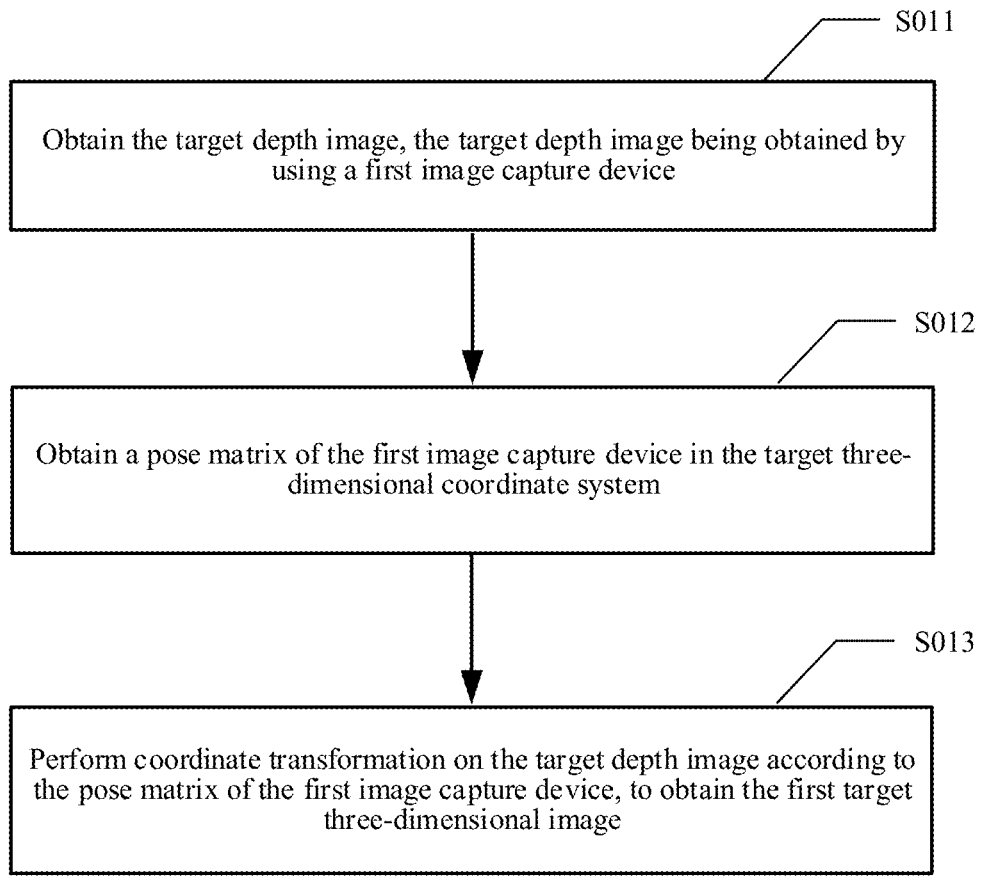
FIG. 7 is a flowchart of step S01 in FIG. 3 according to an exemplary embodiment.

FIG. 7 is a flowchart of step S01 in FIG. 3 according to an exemplary embodiment.

In some embodiments, the first target three-dimensional image may be obtained by using a target depth image. Referring to FIG. 7, the following process may be included for obtaining the first target three-dimensional image according to the target depth image.

Step S011: Obtain the target depth image, the target depth image being obtained by using a first image capture device.

In some embodiments, the first image capture device may be a target depth camera, and image capture may be performed on a target scene including a to-be-recognized target by using a target depth camera, to obtain a target depth image of the target scene.

Step S012: Obtain a pose matrix of the first image capture device in the target three-dimensional coordinate system.

In some embodiments, a real-time pose matrix of the target depth camera in the target three-dimensional coordinate system may be obtained according to SLAM.

Step S013: Perform coordinate transformation on the target depth image according to the pose matrix of the first image capture device, to obtain the first target three-dimensional image.

In some embodiments, if the pose matrix of the first image capture device in the target three-dimensional coordinate system has been determined, and a position of the target depth image in a camera coordinate system of the first image capture device is also known (which may be determined by using a grayscale value of the target depth image), the target depth image may be transformed through matrix transformation to obtain the first target three-dimensional image in the target three-dimensional coordinate system. Details are not described in the present disclosure.

According to the technical solution provided in this embodiment, the first target three-dimensional image including the to-be-recognized object may be accurately obtained by using the target depth image including the to-be-recognized object.

Figure 8:
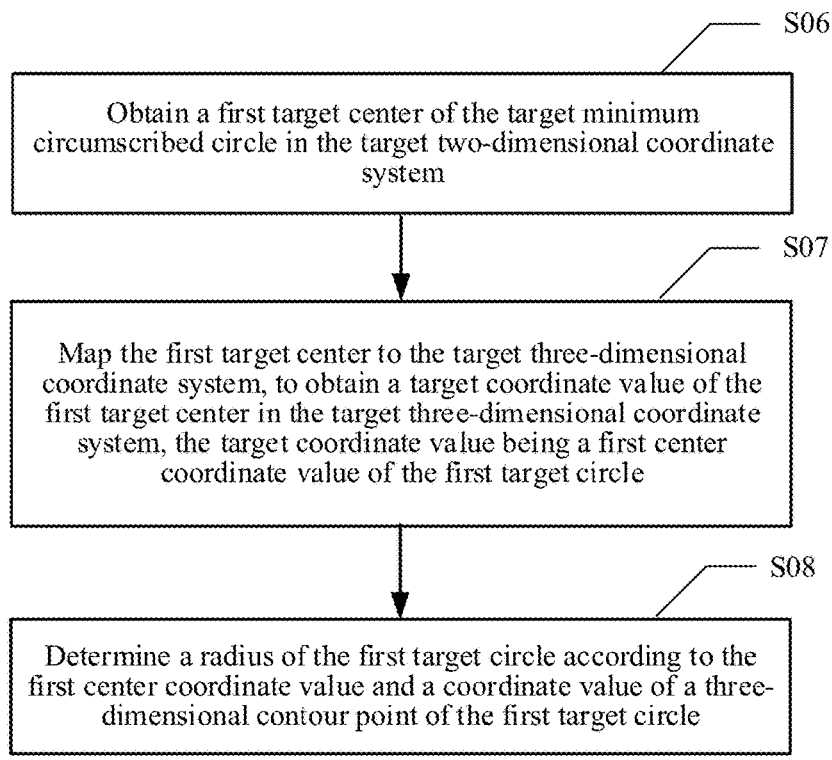
FIG. 8 shows an image processing method according to an exemplary embodiment.

FIG. 8 shows an image processing method according to an exemplary embodiment.

In some embodiments, assuming that the to-be-recognized first target graphic in the first target three-dimensional image is a circle (which may be referred to as a first target circle), the minimum circumscribed target graphic in this embodiment needs to be a minimum circumscribed circle (which may be referred to as a target minimum circumscribed circle).

In some embodiments, after the first target circle in the first target three-dimensional image is determined, a center position of the first target circle may be further determined.

Referring to FIG. 8, the image processing method may include the following steps.

Step S06: Obtain a first target center of the target minimum circumscribed circle in the target two-dimensional coordinate system.

Step S07: Map the first target center from the two-dimensional coordinate system to the three-dimensional coordinate system, to obtain a target coordinate value of the first target center in the target three-dimensional coordinate system, the target coordinate value being a first center coordinate value of the first target circle.

In some embodiments, due to a reason such as a photographing angle or the first target circle being blocked, the first target circle in the first target three-dimensional image may not be presented as a complete circle. Therefore, the first target circle and a position of the first target circle cannot be directly determined in the first target three-dimensional image through circle recognition.

In some embodiments, the target minimum circumscribed circle may be mapped as the first target circle to a circle image in the target two-dimensional coordinate system. Then, three-dimensional coordinates obtained by reversely mapping a center of the target minimum circumscribed circle to the target three-dimensional coordinate system may be center coordinates of the first target circle.

Step S08: Determine a radius of the first target circle according to the first center coordinate value and a coordinate value of a three-dimensional contour point of the first target circle.

In some embodiments, a distance between each three-dimensional contour point of the first target circle and the center of the first target circle may be determined by using a coordinate value of each three-dimensional contour point of the first target circle and the first center coordinate value, and a maximum distance value may be used as the radius of the first target circle.

Figure 9:
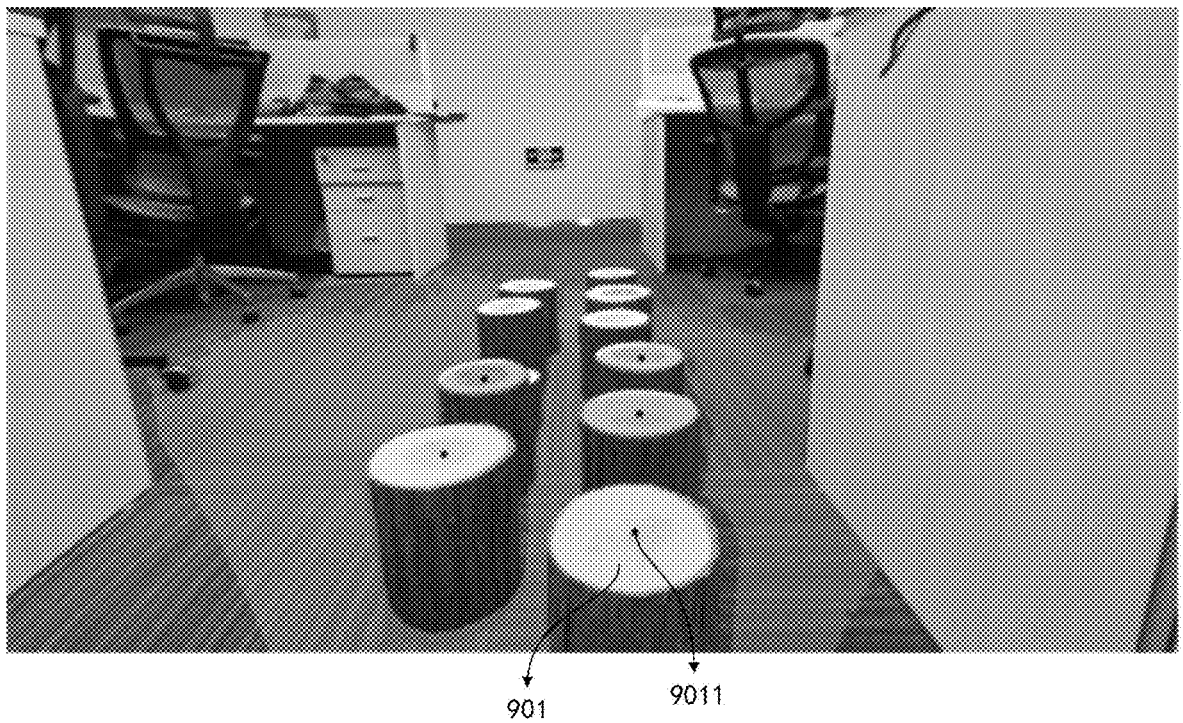
FIG. 9 is a schematic diagram of determining a first target circle in a first target three-dimensional image according to an exemplary embodiment.

According to the technical solution provided in this embodiment, first, the first target center of the target minimum circumscribed circle is determined in the target two-dimensional coordinate system. Then, the first target center is mapped to the target three-dimensional coordinate system to obtain the center of the first target circle, and the three-dimensional coordinate value of the first target center in the target three-dimensional coordinate system is used as a center coordinate value (which may be referred to as a first center coordinate value) of the first target circle. The radius of the first target circle is determined according to the three-dimensional contour point of the first target circle and the center of the first target circle. According to the method, a first center 9011 of a first target circle 901 shown in FIG. 9 may be accurately determined in the first target three-dimensional image, and a first center coordinate value of the first target circle 901 and a radius of the first target circle 901 may be accurately obtained.

Figure 10:
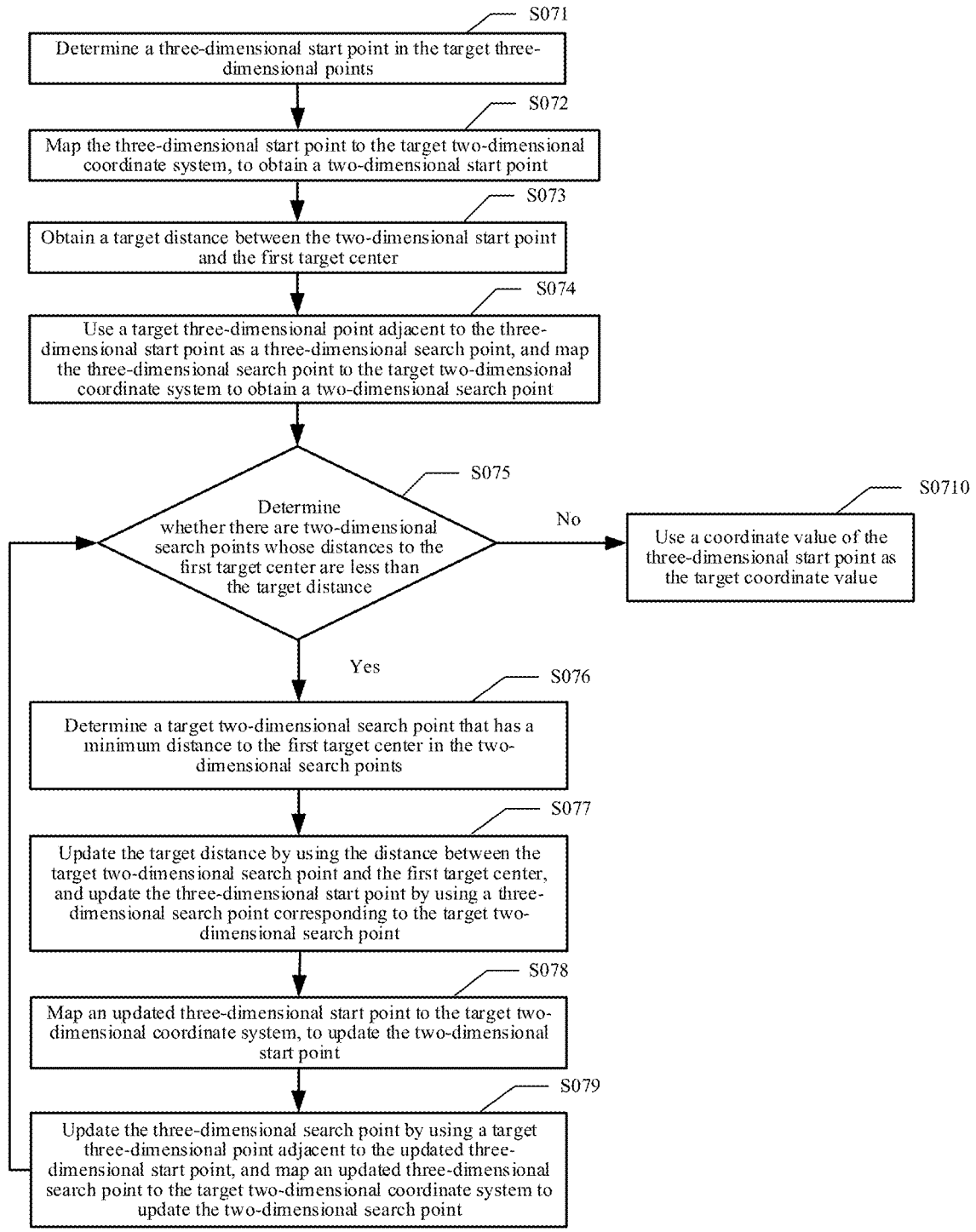
FIG. 10 is a flowchart of step S07 in FIG. 8 according to an exemplary embodiment.

FIG. 10 is a flowchart of step S07 in FIG. 8 according to an exemplary embodiment.

In some embodiments, because pixels in the first target three-dimensional image are discrete, and the first target center is obtained through fitting, the first target center does not have corresponding three-dimensional coordinates in the target three-dimensional coordinate system.

In some embodiments, the target three-dimensional points may be searched by using a flood fill algorithm, to determine a three-dimensional coordinate value corresponding to the first target center.

In some embodiments, the following steps may be included for searching the target three-dimensional points by using the flood fill algorithm.

Step S071: Determine a three-dimensional start point in the target three-dimensional points.

In some embodiments, to localize a three-dimensional point corresponding to the first target center in the target three-dimensional coordinate system faster, the target three-dimensional points in the target plane may be averaged to obtain a start search point. In some other embodiments, any one of the target three-dimensional points in the target plane may be selected as a three-dimensional start point. This is not limited in the present disclosure.

Step S072: Map the three-dimensional start point to the target two-dimensional coordinate system, to obtain a two-dimensional start point.

In some embodiments, because the target three-dimensional points in the target three-dimensional coordinate system are in a one-to-one correspondence with the target two-dimensional points in the target two-dimensional coordinate system, a target two-dimensional point corresponding to the three-dimensional start point may be directly obtained as the two-dimensional start point.

Step S073: Obtain a target distance between the two-dimensional start point and the first target center.

In some embodiments, a target distance d between the two-dimensional start point and the first target center may be obtained in the target two-dimensional coordinate system.

Step S074: Use a target three-dimensional point adjacent to the three-dimensional start point as a three-dimensional search point, and map the three-dimensional search point to the target two-dimensional coordinate system to obtain a two-dimensional search point.

In some embodiments, the target three-dimensional points in the first target three-dimensional image may be stored in a row-column form. Then, the target three-dimensional point adjacent to the three-dimensional start point may refer to target three-dimensional points adjacent to the three-dimensional start point in storage positions in four directions, including upper, lower, left, and right, or may refer to target three-dimensional points adjacent to the three-dimensional start point in storage positions in eight directions, including upper, lower, left, right, upper left, lower left, upper right, and lower right. This is not limited in the present disclosure.

In some embodiments, each three-dimensional search point may be mapped to the target two-dimensional coordinate system, to obtain a two-dimensional search point, to perform search according to the two-dimensional search point.

Step S075: Determine whether there are two-dimensional search points whose distances to the first target center are less than the target distance.

In some embodiments, a distance between each two-dimensional search point and the first target center may be obtained, and it is determined whether there are two-dimensional search points whose distances to the first target center are less than the target distance.

Step S076: Determine a target two-dimensional search point that has a minimum distance to the first target center in the two-dimensional search points.

In some embodiments, if there are two-dimensional search points whose distances to the first target center are less than the target distance, a two-dimensional search point that is the closest to the first target center is used as the target two-dimensional search point, to continue to search the target three-dimensional points.

Step S077: Update the target distance by using the distance between the target two-dimensional search point and the first target center, and update the three-dimensional start point by using a three-dimensional search point corresponding to the target two-dimensional search point.

Assuming that the target distance is d, and the distance between the target two-dimensional search point and the first target center is d', d may be made equal to d', to update the target distance.

In some embodiments, a target three-dimensional search point in the target three-dimensional coordinate system corresponds to the target two-dimensional search point, and the target three-dimensional search point may be used as a new three-dimensional start point.

Step S078: Map an updated three-dimensional start point to the target two-dimensional coordinate system, to update the two-dimensional start point.

Step S079: Update the three-dimensional search point by using a target three-dimensional point adjacent to the updated three-dimensional start point, and map an updated three-dimensional search point from the three-dimensional coordinate system to the two-dimensional coordinate system to update the two-dimensional search point.

In some embodiments, after the three-dimensional start point is updated, a target three-dimensional point adjacent to the three-dimensional start point may be further obtained in the first target three-dimensional image to update the three-dimensional search point.

In some embodiments, an updated three-dimensional search point further needs to be mapped to the target two-dimensional coordinate system to update the two-dimensional search point, and search continues to be performed according to step S075 to step S079, until a distance between each current two-dimensional search point and the first target center is greater than a current target distance, and step S0710 is performed.

Step S0710: Use a coordinate value of the three-dimensional start point as the target coordinate value.

Figure 11:
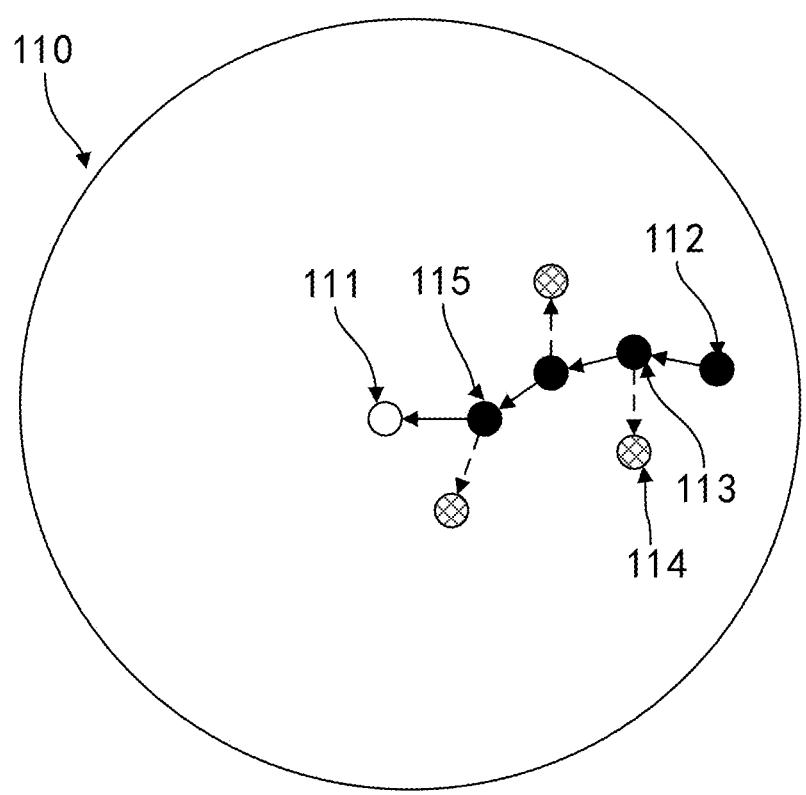
FIG. 11 is a schematic diagram of completing target coordinate value search according to a two-dimensional search point in a target minimum circumscribed circle according to an exemplary embodiment.

FIG. 11 is a schematic diagram of completing target coordinate value search according to a two-dimensional search point in a target minimum circumscribed circle according to an exemplary embodiment.

As shown in FIG. 11, in a target minimum circumscribed circle 110, a solid circular point represents a two-dimensional search point, a hollow circular point represents a two-dimensional search point at which search is stopped, a path represented by a solid arrow may represent a valid search path (that is, two-dimensional search points on the path are gradually close to a first target center 111, and a target coordinate value close to the first target center may be found by using the path), and a path represented by a dashed arrow may represent an invalid search path (that is, two-dimensional search points on the path are gradually away from the first target center, and search on the path is stopped). As shown in FIG. 11, according to the technical solution provided in this embodiment, two-dimensional search points in the target two-dimensional coordinate system may be controlled to be gradually close to the first target center 111, so that three-dimensional search points corresponding to the two-dimensional search points are gradually close to the center of the first target circle, to obtain the target coordinate value of the center of the first target circle.

According to the technical solution provided in this embodiment, the three-dimensional search point in the target three-dimensional coordinate system is mapped to the target two-dimensional coordinate system, to obtain the two-dimensional search point, thereby implementing a mapping between the two-dimensional search point and the three-dimensional search point. According to the technical solution provided in this embodiment, after a mapping relationship between the two-dimensional search points and the three-dimensional search points is constructed, the two-dimensional search points are controlled to be gradually close to the first target center, so that the three-dimensional search points in the target three-dimensional coordinate system are gradually close to the center of the first target circle, to obtain the target coordinate value of the first target circle.

According to the technical solution provided in this embodiment, a mapping relationship between the target three-dimensional search point and the target two-dimensional search point is constructed through transformation of the target three-dimensional point in the target three-dimensional coordinate system and the target two-dimensional coordinate system, the two-dimensional point that is the closest to the first target center is determined by searching for the target two-dimensional search point in the target two-dimensional coordinate system, and the two-dimensional point that is the closest to the first target center is mapped to the target three-dimensional coordinate system to obtain the center coordinate value of the first target circle.

In some other embodiments, the target coordinate value determined through flood fill may be used as a coordinate value of a target mapped point obtained by mapping the first target center from the two-dimensional coordinate system to the three-dimensional coordinate system. Then, a distance between the target mapped point and each three-dimensional contour point of the first target circle is obtained, and a maximum distance is used as the radius of the first target circle. The coordinate value of the target mapped point is used as the target coordinate value of the first target center in the target three-dimensional coordinate system when the distance between each three-dimensional contour point of the first target circle and the target mapped point falls within a target range.

According to the technical solution provided in this embodiment, a first target circle with a radius value greater than the target range may be filtered out.

Figure 12:
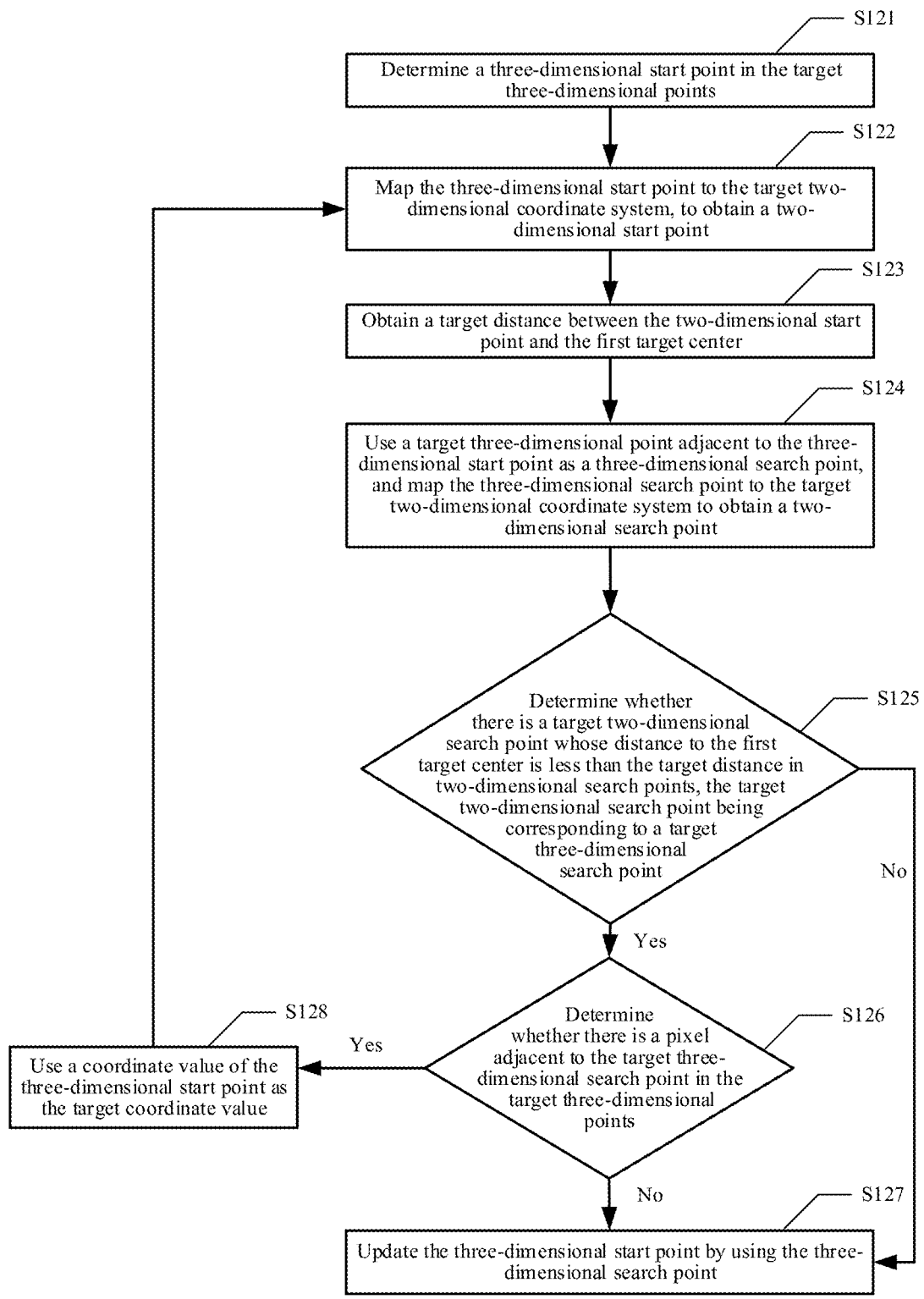
FIG. 12 shows a method of mapping a first target center to a target three-dimensional coordinate system according to an exemplary embodiment.

FIG. 12 shows a method of mapping a first target center to a target three-dimensional coordinate system according to an exemplary embodiment. Referring to FIG. 12, the method may include the following steps.

Step S121: Determine a three-dimensional start point in the target three-dimensional points.

Step S122: Map the three-dimensional start point to the target two-dimensional coordinate system, to obtain a two-dimensional start point.

As shown in FIG. 11, the three-dimensional start point may be mapped to the target two-dimensional coordinate system, to obtain a two-dimensional start point 112 shown in FIG. 11.

Step S123: Obtain a target distance between the two-dimensional start point and the first target center.

In some embodiments, a target distance d between the two-dimensional start point 112 and the first target center 111 in FIG. 11 may be obtained.

Step S124: Use a target three-dimensional point adjacent to the three-dimensional start point as a three-dimensional search point, and map the three-dimensional search point to the target two-dimensional coordinate system to obtain a two-dimensional search point.

In some embodiments, a two-dimensional search point 113 shown in FIG. 11 may be obtained by mapping the three-dimensional search point to the target two-dimensional coordinate system. It is to be understood that more than one target three-dimensional point may be adjacent to the three-dimensional start point.

In some embodiments, a distance d' between the two-dimensional search point 113 and the first target center 111 may be obtained.

Step S125: Determine whether there is a target two-dimensional search point whose distance to the first target center is less than the target distance, the target two-dimensional search point being corresponding to a target three-dimensional search point.

In some embodiments, if there is a target two-dimensional search point whose distance to the first target center is less than the target distance in two-dimensional search points, step S126 continues to be performed.

As shown in FIG. 11, the distance d' between the two-dimensional search point 113 and the first target center 111 is less than the distance between the two-dimensional start point 112 and the first target center 111. Therefore, step S126 needs to be performed to continue to perform search on a target three-dimensional search point corresponding to the target two-dimensional search point 113.

Step S126: Determine whether there is a pixel adjacent to the target three-dimensional search point in the target three-dimensional points.

In some embodiments, it is determined whether there is a target three-dimensional point adjacent to the current target three-dimensional search point in the target plane. If there is still a target three-dimensional point adjacent to the current target three-dimensional search point in the target plane, step S127 continues to be performed.

Step S127: Update the three-dimensional start point by using the three-dimensional search point.

In some embodiments, the current target three-dimensional search point may be used as a three-dimensional start point, and the updated three-dimensional start point may be mapped to the target two-dimensional coordinate system to obtain a two-dimensional start point 113.

In some embodiments, after the two-dimensional start point is updated, steps S122 to S126 continue to be performed, until it is determined in step S125 that there is no target two-dimensional search point whose distance to the first target center is less than a current target distance in the two-dimensional search points, or it is determined in step S126 that there is no pixel adjacent to the target three-dimensional search point in the target three-dimensional points, and step S128 continues to be performed.

Step S128: Use a coordinate value of the three-dimensional start point as the target coordinate value.

According to the technical solution provided in this embodiment, a mapping relationship between the target three-dimensional search point and the target two-dimensional search point is constructed through transformation of the target three-dimensional point in the target three-dimensional coordinate system and the target two-dimensional coordinate system, the two-dimensional point that is the closest to the first target center is determined by searching for the target two-dimensional search point in the target two-dimensional coordinate system, and the two-dimensional point that is the closest to the first target center is mapped to the target three-dimensional coordinate system to obtain the center coordinate value of the first target circle.

Figure 13:
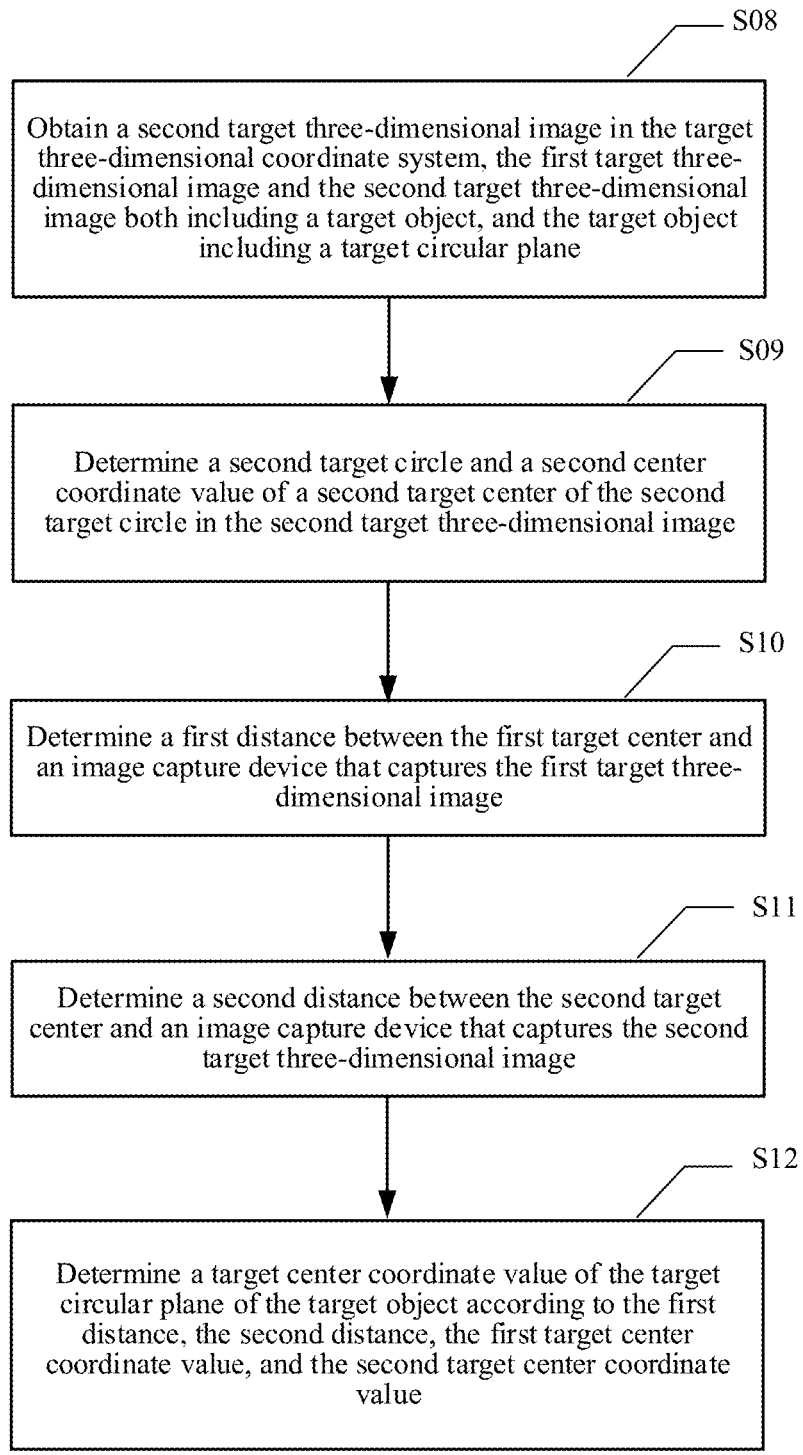
FIG. 13 shows an image processing method according to an exemplary embodiment.

FIG. 13 shows an image processing method according to an exemplary embodiment.

For a depth image capture device, depth data of image capture is usually limited by working distances, including a shortest working distance and a longest working distance. Depth information beyond the working distances is unreliable and is usually filtered out directly. However, within an effective working distance range, depth information is related to a distance, that is, an object being closer to the camera indicates more accurate depth information to be obtained, and a center and a radius of a circular plane extracted within a closer distance range are more accurate.

According to the technical solution provided in this embodiment of the present disclosure, a method that may be used to accurately determine a center of a target plane is provided.

Referring to FIG. 13, the image processing method may include the following steps.

Step S08: Obtain a second target three-dimensional image in the target three-dimensional coordinate system, the first target three-dimensional image and the second target three-dimensional image both including a target object, and the target object including a target circular plane.

In some embodiments, the target object may be a to-be-recognized target cylinder or the like, and the target object may include a to-be-recognized target circular plane.

In some embodiments, a first depth image capture device and a second depth image capture device may be used to perform image capture on the target circular plane of the target object respectively. The first depth image capture device and the second depth image capture device may be the same device or different devices, which is not limited in the present disclosure.

Step S09: Determine a second target circle and a second center coordinate value of a second target center of the second target circle in the second target three-dimensional image.

In some embodiments, the first target circle and the first center coordinate value of the first target circle may be determined from the first target three-dimensional image by using the image processing method provided in the present disclosure.

In some embodiments, the second target circle and the second center coordinate value of the second target circle may be determined from the second target three-dimensional image by using the image processing method provided in the present disclosure.

Step S10: Determine a first distance between the first target center and an image capture device that captures the first target three-dimensional image.

Step S11: Determine a second distance between the second target center and an image capture device that captures the second target three-dimensional image.

The first distance and the second distance may be distances determined in the same coordinate system (for example, the target three-dimensional coordinate system).

Step S12: Determine a target center coordinate value of the target circular plane of the target object according to the first distance, the second distance, the first target center coordinate value, and the second target center coordinate value.

In some embodiments, the first distance $d_1$ may be processed according to formula (1) to determine a first weight $w_1$ of the first target center coordinate value, the second distance $d_2$ may be further processed according to formula (1) to determine a second weight $w_2$ of the second target center coordinate value, and then the first target center coordinate value $c_1$ and the second target center coordinate value $c_2$ are respectively weighted according to formula (2) by using the first weight $w_1$ and the second weight $w_2$, to obtain the target center coordinate value of the target circular plane of the target object:

$$w_i = \frac{1}{d_i^2} \quad (1)$$

$d_i$ in formula (1) representing a distance between a center of the target circular plane of the target object in an $i^{th}$ frame of image and an image capture device of the image; and $$C = \frac{w_i c_i}{\sum w_i} \quad (2)$$

$c_i$ in formula (2) representing a center coordinate value of the center of the target circular plane of the target object in the $i^{th}$ frame of image.

According to the technical solution provided in this embodiment, the center coordinate value of the target circular plane of the target object may be accurately determined.

Figure 14:
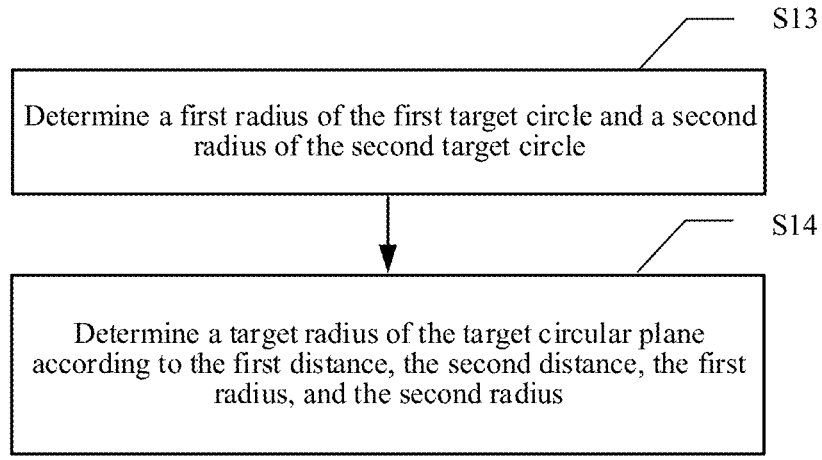
FIG. 14 shows an image processing method according to an exemplary embodiment.

FIG. 14 shows an image processing method according to an exemplary embodiment.

Referring to FIG. 14, the image processing method may include the following steps.

Step S13: Determine a first radius of the first target circle and a second radius of the second target circle.

Step S14: Determine a target radius of the target circular plane according to the first distance, the second distance, the first radius, and the second radius.

In some embodiments, the first radius r1 of the first target circle and the second radius r2 of the second target circle may be respectively used as $c_1$ and $c_2$ in formula (2), and then the target radius of the target circular plane may be accurately determined according to formula (2).

According to the technical solution provided in this embodiment of the present disclosure, a method that may be used to accurately determine a radius of a target plane is provided.

Figure 15:
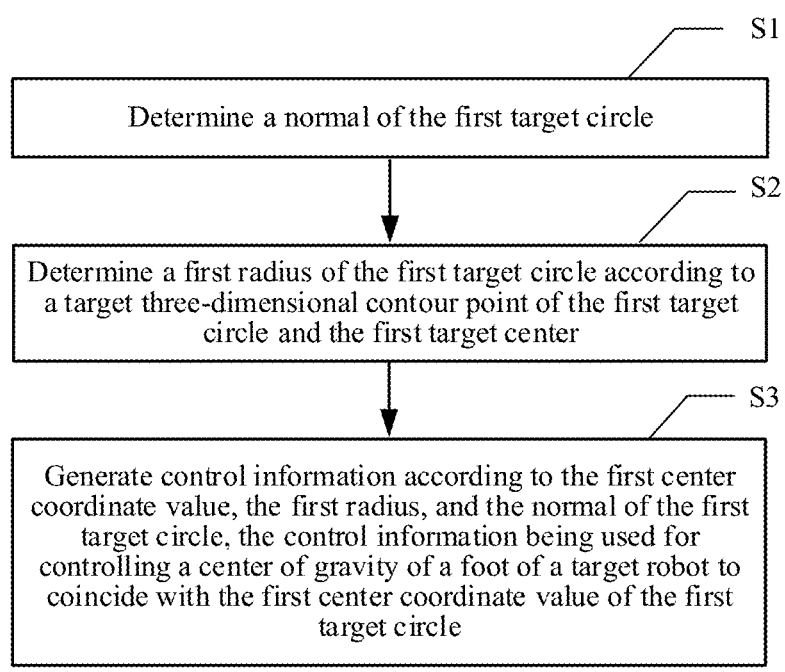
FIG. 15 shows an image processing method according to an exemplary embodiment.

FIG. 15 shows an image processing method according to an exemplary embodiment. Referring to FIG. 15, the image processing method may include the following steps.

Step S1: Determine a normal of the first target circle.

In some embodiments, a plane equation of each target plane may be obtained during plane fitting on the first target three-dimensional image. The first target circle is selected from the target planes. Therefore, a normal direction of the first target circle may be directly obtained according to the plane equation of the target plane.

Step S2: Determine a first radius of the first target circle according to a target three-dimensional contour point of the first target circle and the first target center.

In some embodiments, distances between the first target center of the first target circle and the three-dimensional contour points of the first target circle may be obtained, and a maximum distance value is used as the radius of the first target circle.

Step S3: Generate control information according to the first center coordinate value, the first radius, and the normal of the first target circle, the control information being used for controlling a center of gravity of a foot of a target robot to coincide with the first center coordinate value of the first target circle.

In some embodiments, the first target circle may be a circular plane of a plum-blossom pile on which a legged robot is about to land. When the center coordinate value and the normal direction of the first target circle are determined, the target robot may be controlled to land at the center position of the first target circle along the normal direction, thereby controlling the target robot to move.

Figure 16:
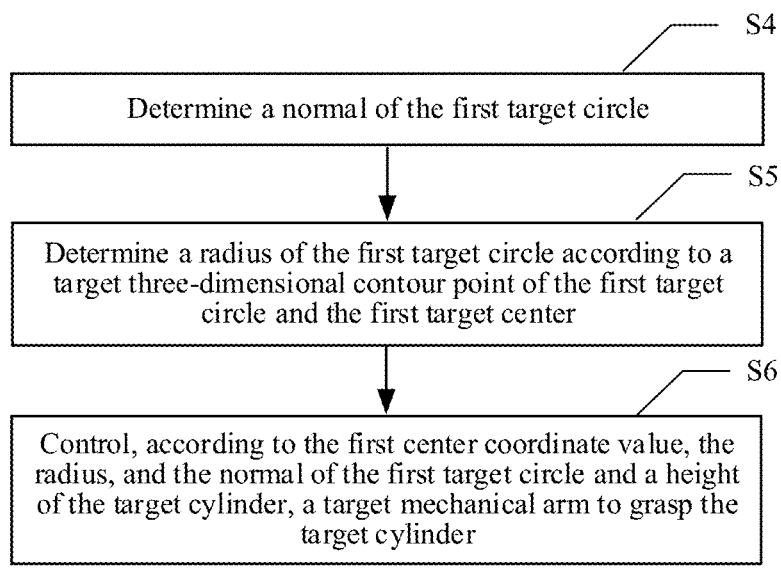
FIG. 16 shows an image processing method according to an exemplary embodiment.

FIG. 16 shows an image processing method according to an exemplary embodiment.

In some embodiments, the first target three-dimensional image is captured from a target circular plane of a target cylinder. Referring to FIG. 16, the image processing method may include the following steps.

Step S4: Determine a normal of the first target circle.

Step S5: Determine a radius of the first target circle according to a target three-dimensional contour point of the first target circle and the first target center.

In some embodiments, distances between the first target center of the first target circle and the three-dimensional contour points of the first target circle may be obtained, and a maximum distance value is used as the radius of the first target circle.

Step S6: Control, according to the first center coordinate value, the radius, and the normal of the first target circle and a height of the target cylinder, a target mechanical arm to grasp the target cylinder.

In some embodiments, the target cylinder may be a target cylinder that the mechanical arm is about to grasp.

In some embodiments, height information of the target cylinder may be known in advance. For example, in a situation of grasping a cylindrical ring-pull can in a pipeline, height information of the ring-pull can may be known. In some other embodiments, height information of the target cylinder may be calculated according to three-dimensional information of the first target graphic. For example, assuming that the target cylinder stands on a table, the table may be first recognized from the first target three-dimensional image and three-dimensional information of the table is obtained. Then, the height information of the target cylinder may be determined according to the first target graphic and the three-dimensional information of the table.

After the first center coordinate value, the radius, and the normal is determined for the target cylinder by using the technical solution provided in this embodiment, the target mechanical arm may be controlled to grasp the target cylinder.

Figure 17:
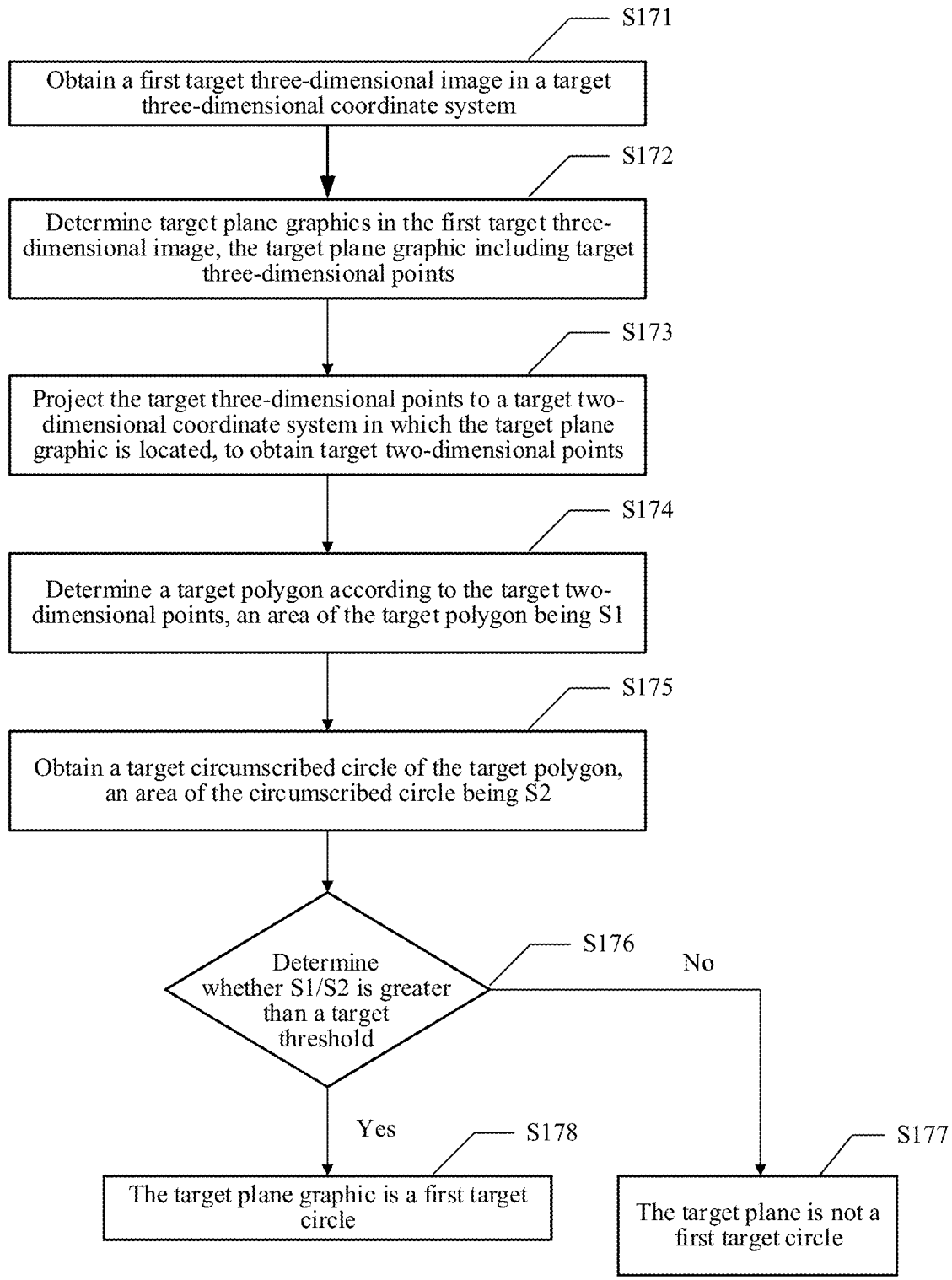
FIG. 17 shows an image processing method according to an exemplary embodiment.

FIG. 17 shows an image processing method according to an exemplary embodiment. Referring to FIG. 17, the image processing method may include the following steps.

Step S171: Obtain a first target three-dimensional image in a target three-dimensional coordinate system.

Step S172: Determine target planes in the first target three-dimensional image, the target plane including target three-dimensional points.

Step S173: Project the target three-dimensional points to a target two-dimensional coordinate system in which the target plane is located, to obtain target two-dimensional points.

Step S174: Determine a target polygon according to the target two-dimensional points, an area of the target polygon being S1.

Step S175: Obtain a target minimum circumscribed circle of the target polygon, an area of the circumscribed circle being S2.

Step S176: Determine whether S1/S2 is greater than a target threshold.

If S1/S2 is greater than the target threshold (for example, 0.8), step S177 is performed. If S1/S2 is less than or equal to the target threshold, Step S178 is performed.

Step S177: The target plane is not a first target circle.

Step S178: The target plane is a first target circle.

According to the technical solution provided in this embodiment, the first target graphic may be accurately recognized from the first target three-dimensional image, to perform an operation according to the first target graphic and the three-dimensional coordinate value of the first target graphic. For example, in a scene in which a legged robot is controlled to move on a plum-blossom pile, the first target graphic may be a circular plane of a plum-blossom pile on which the legged robot is about to land. After the circular plane of the to-be-landed-on plum-blossom pile and three-dimensional position coordinates of the circular plane are determined, the legged robot may be controlled to land according to the circular plane and the three-dimensional position coordinates of the circular plane. In another example, in a scene in which a mechanical arm grasps a target cylinder, the first target graphic may be a circular plane of the target cylinder. After the circular plane of the target cylinder and three-dimensional position information of the circular plane are determined, the mechanical arm may be controlled to grasp the target cylinder according to a position of the circular plane of the target cylinder and information such as a height of the target cylinder.

Figure 18:
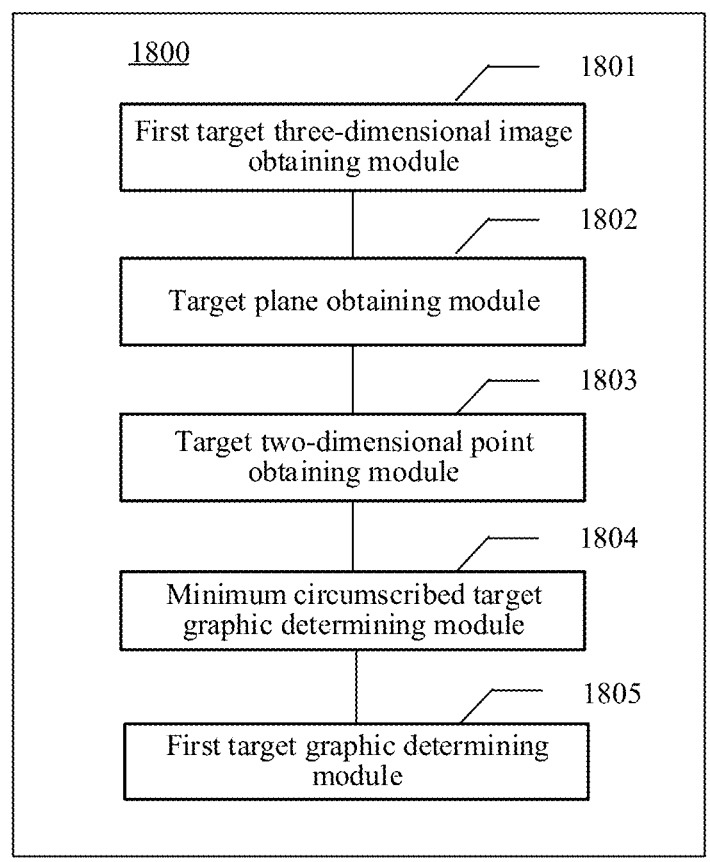
FIG. 18 is a block diagram of an image processing apparatus according to an exemplary embodiment.

FIG. 18 is a block diagram of an image processing apparatus according to an exemplary embodiment. Referring to FIG. 18, the image processing apparatus 1800 provided in this embodiment of the present disclosure may include: a first target three-dimensional image obtaining module 1801, a target plane obtaining module 1802, a target two-dimensional point obtaining module 1803, a minimum circumscribed target graphic determining module 1804, and a first target graphic determining module 1805.

The first target three-dimensional image obtaining module 1801 may be configured to obtain a first target three-dimensional image in a target three-dimensional coordinate system. The target plane obtaining module 1802 may be configured to determine target planes in the first target three-dimensional image, the target plane including target three-dimensional points. The target two-dimensional point obtaining module 1803 may be configured to project the target three-dimensional points to a target two-dimensional coordinate system in which the target plane is located, to obtain target two-dimensional points. The minimum circumscribed target graphic determining module 1804 may be configured to determine a target polygon and a minimum circumscribed target graphic of the target polygon according to the target two-dimensional points. The first target graphic determining module 1805 may be configured to recognize the minimum circumscribed target graphic as a first target graphic of the target object in the first target three-dimensional image.

In some embodiments, the minimum circumscribed target graphic is a target minimum circumscribed circle, and the first target graphic is a first target circle.

In some embodiments, the image processing apparatus 1800 may include: a first target center obtaining unit and a first center coordinate value obtaining unit.

The first target center obtaining unit may be configured to obtain a first target center of the target minimum circumscribed circle in the target two-dimensional coordinate system. The first center coordinate value obtaining unit may be configured to map the first target center from the two-dimensional coordinate system to the three-dimensional coordinate system, to obtain a target coordinate value of the first target center in the target three-dimensional coordinate system, the target coordinate value being a first center coordinate value of the first target circle; and determine a radius of the first target circle according to the first center coordinate value and a coordinate value of a three-dimensional contour point of the first target circle.

In some embodiments, the first center coordinate value obtaining unit may include: a three-dimensional start point obtaining subunit, a two-dimensional start point obtaining subunit, a target distance obtaining subunit, a two-dimensional search point obtaining subunit, and a target coordinate value obtaining subunit.

The three-dimensional start point obtaining subunit may be configured to determine a three-dimensional start point in the target three-dimensional points. The two-dimensional start point obtaining subunit may be configured to map the three-dimensional start point from the three-dimensional coordinate system to the two-dimensional coordinate system, to obtain a two-dimensional start point. The target distance obtaining subunit may be configured to obtain a target distance between the two-dimensional start point and the first target center. The two-dimensional search point obtaining subunit may be configured to use a target three-dimensional point adjacent to the three-dimensional start point as a three-dimensional search point, and map the three-dimensional search point to the target two-dimensional coordinate system to obtain a two-dimensional search point. The target coordinate value obtaining subunit may be configured to use a coordinate value of the three-dimensional start point as the target coordinate value when a distance between each two-dimensional search point and the first target center is greater than or equal to the target distance.

In some embodiments, the first center coordinate value obtaining unit may further include: a target two-dimensional search point obtaining subunit, a three-dimensional start point update subunit, two-dimensional start point update subunit, and a three-dimensional search point update subunit.

The target two-dimensional search point obtaining subunit may be configured to determine, when there are two-dimensional search points whose distances to the first target center are less than the target distance, a target two-dimensional search point that has a minimum distance to the first target center in the two-dimensional search points. The three-dimensional start point update subunit may be configured to update the target distance by using the distance between the target two-dimensional search point and the first target center, and update the three-dimensional start point by using a three-dimensional search point corresponding to the target two-dimensional search point. The two-dimensional start point update subunit may be configured to map an updated three-dimensional start point to the target two-dimensional coordinate system, to update the two-dimensional start point. The three-dimensional search point update subunit may be configured to update the three-dimensional search point by using a target three-dimensional point adjacent to the updated three-dimensional start point, and map an updated three-dimensional search point from the three-dimensional coordinate system to the two-dimensional coordinate system to update the two-dimensional search point.

In some embodiments, the target two-dimensional point obtaining module 1803 may include: a three-dimensional contour point determining unit and a two-dimensional contour point determining unit.

The three-dimensional contour point determining unit may be configured to determine target three-dimensional contour points of the target plane in the target three-dimensional points. The two-dimensional contour point determining unit may be configured to project the target three-dimensional contour points from the three-dimensional coordinate system to the two-dimensional coordinate system, to obtain target two-dimensional contour points, so as to determine the target polygon according to the target two-dimensional contour points.

In some embodiments, the image processing apparatus may further include: a second target three-dimensional image obtaining module, a second target circle obtaining module, a first distance determining module, a second distance determining module, and a target center coordinate value determining module.

The second target three-dimensional image obtaining module may be configured to obtain a second target three-dimensional image in the target three-dimensional coordinate system, the first target three-dimensional image and the second target three-dimensional image both including a target object, and the target object including a target circular plane. The second target circle obtaining module may be configured to determine a second target circle and a second center coordinate value of a second target center of the second target circle in the second target three-dimensional image. The first distance determining module may be configured to determine a first distance between the first target center and an image capture device that captures the first target three-dimensional image. The second distance determining module may be configured to determine a second distance between the second target center and an image capture device that captures the second target three-dimensional image. The target center coordinate value determining module may be configured to determine a target center coordinate value of the target circular plane of the target object according to the first distance, the second distance, the first target center coordinate value, and the second target center coordinate value.

In some embodiments, the image processing apparatus may further include: a radius obtaining module and a target radius determining module.

The radius obtaining module may be configured to determine a first radius of the first target circle and a second radius of the second target circle. The target radius determining module may be configured to determine a target radius of the target circular plane according to the first distance, the second distance, the first radius, and the second radius.

In some embodiments, the first center coordinate value obtaining unit may include: a mapped point obtaining unit, a distance obtaining subunit, and a target coordinate value obtaining subunit.

The mapped point obtaining unit may be configured to map the first target center from the two-dimensional coordinate system to the three-dimensional coordinate system, to obtain a target mapped point and a coordinate value of the target mapped point. The distance obtaining subunit may be configured to obtain a distance between the target mapped point and each three-dimensional contour point of the first target circle. The target coordinate value obtaining subunit may be configured to use the coordinate value of the target mapped point as the target coordinate value of the first target center in the target three-dimensional coordinate system when the distance between each three-dimensional contour point of the first target circle and the target mapped point falls within a target range.

In some embodiments, the image processing apparatus may further include: a first normal determining module, a first radius obtaining module, and a robot control module.

The first normal determining module may be configured to determine a normal of the first target circle. The first radius obtaining module may be configured to determine a first radius of the first target circle according to a target three-dimensional contour point of the first target circle and the first target center. The robot control module may be configured to generate control information according to the first center coordinate value, the first radius, and the normal of the first target circle, the control information being used for controlling a center of gravity of a foot of a target robot to coincide with the first center coordinate value of the first target circle.

In some embodiments, the first target three-dimensional image is captured from a target circular plane of a target cylinder.

In some embodiments, the image processing apparatus may include: a second normal determining module, a second radius obtaining module, and a mechanical arm control module.

The second normal determining module may be configured to determine a normal of the first target circle. The second radius obtaining module may be configured to determine a radius of the first target circle according to a target three-dimensional contour point of the first target circle and the first target center. The mechanical arm control module may be configured to control, according to the first center coordinate value, the radius, and the normal of the first target circle and a height of the target cylinder, a target mechanical arm to grasp the target cylinder.

In some embodiments, the first target three-dimensional image is obtained by using a target depth image.

In some embodiments, the first target three-dimensional image obtaining module 1801 may include: a target depth image obtaining unit, a pose matrix obtaining unit, and a first target three-dimensional image obtaining unit.

The target depth image obtaining unit may be configured to obtain the target depth image, the target depth image being obtained by using a first image capture device. The pose matrix obtaining unit may be configured to obtain a pose matrix of the first image capture device in the target three-dimensional coordinate system. The first target three-dimensional image obtaining unit may be configured to perform coordinate transformation on the target depth image according to the pose matrix of the first image capture device, to obtain the first target three-dimensional image.

Because functional modules of the image processing apparatus 1800 in the exemplary embodiment of the present disclosure corresponds to steps in the exemplary embodiment of the image processing method, details are not repeated herein.

Through the descriptions of the foregoing implementations, a person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other media used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a number of forms, such as a static RAM (SRAM), a dynamic RAM (DRAM), a synchronous DRAM (SDRAM), a double data rate SDRAM (DDRS-DRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

In addition, the foregoing accompanying drawings are only schematic illustrations of the processes included in the method according to exemplary embodiments of the present disclosure, and are not intended for limitation. It is easily understood that the processes illustrated in the foregoing accompanying drawings do not indicate or define the chronological order of these processes. In addition, it is also easily understood that these processes may be performed, for example, synchronously or asynchronously in a plurality of modules.

A person skilled in the art can easily figure out other embodiments of the present disclosure after considering the specification and practicing the invention disclosed herein. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the related art. The specification and the embodiments are considered as merely exemplary, and the real scope and spirit of the present disclosure are pointed out in the claims.

It is to be understood that, the present disclosure is not limited to the detailed structures, accompanying manners, or implementation methods shown herein. On the contrary, the present disclosure is intended to cover various modifications and equivalent configurations within the spirit and scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image processing method performed by an electronic device, the method comprising:
   obtaining a depth image of a target object in a three-dimensional coordinate system by using a first image capture device;
   obtaining a pose matrix of the first image capture device in the three-dimensional coordinate system;
   performing coordinate transformation on the depth image according to the pose matrix of the first image capture device, to obtain a first target three-dimensional image of the target object in the three-dimensional coordinate system;
   determining a target plane of the target object in the first three-dimensional image via plane fitting, the target plane comprising target three-dimensional points in the three-dimensional coordinate system;
   projecting the target three-dimensional points to a two-dimensional coordinate system defined on the target plane, to obtain target two-dimensional points in the two-dimensional coordinate system;
   determining a target polygon and a minimum circumscribed target graphic of the target polygon in the two-dimensional coordinate system according to the target two-dimensional points, wherein the minimum circumscribed target graphic is a target minimum circumscribed circle;
   obtaining a first target center of the target minimum circumscribed circle in the two-dimensional coordinate system;
   mapping the first target center from the two-dimensional coordinate system to the three-dimensional coordinate system, to obtain a target coordinate value of the first target center in the three-dimensional coordinate system, the target coordinate value being a first center coordinate value of the first target circle in the three-dimensional coordinate system; and
   recognizing the target minimum circumscribed circle as a first target circle of the target object in the first target three-dimensional image when an area ratio between the target polygon and the target minimum circumscribed circle is greater than a predefined threshold.

2. The method according to claim 1, wherein the method further comprises:
   determining a radius of the first target circle in the three-dimensional coordinate system according to the first center coordinate value and a coordinate value of a three-dimensional contour point of the first target circle.

3. The method according to claim 2, wherein the mapping the first target center from the two-dimensional coordinate system to the three-dimensional coordinate system, to obtain a target coordinate value of the first target center in the three-dimensional coordinate system comprises:
   determining a three-dimensional start point in the target three-dimensional points;
   mapping the three-dimensional start point from the three-dimensional coordinate system to the two-dimensional coordinate system, to obtain a two-dimensional start point;
   obtaining a target distance between the two-dimensional start point and the first target center in the two-dimensional coordinate system;
   using a target three-dimensional point adjacent to the three-dimensional start point as a three-dimensional search point, and mapping the three-dimensional search point from the three-dimensional coordinate system to the two-dimensional coordinate system to obtain a two-dimensional search point; and
   using a coordinate value of the three-dimensional start point as the target coordinate value when a distance between the two-dimensional search point and the first target center is greater than or equal to the target distance.

4. The method according to claim 3, wherein the mapping the first target center from the two-dimensional coordinate system to the three-dimensional coordinate system, to obtain a target coordinate value of the first target center in the three-dimensional coordinate system further comprises:
   determining, when there are two-dimensional search points whose distances to the first target center are less than the target distance, a target two-dimensional search point that has a minimum distance to the first target center in the two-dimensional search points;
   updating the target distance by using the distance between the target two-dimensional search point and the first target center, and updating the three-dimensional start point by using a three-dimensional search point corresponding to the target two-dimensional search point;
   mapping an updated three-dimensional start point from the three-dimensional coordinate system to the two-dimensional coordinate system, to update the two-dimensional start point; and
   updating the three-dimensional search point by using a target three-dimensional point adjacent to the updated three-dimensional start point, and mapping an updated three-dimensional search point from the three-dimensional coordinate system to the two-dimensional coordinate system to update the two-dimensional search point.

5. The method according to claim 1, wherein the projecting the target three-dimensional points to a two-dimensional coordinate system defined on the target plane, to obtain target two-dimensional points in the two-dimensional coordinate system comprises:
   determining target three-dimensional contour points of the target plane in the target three-dimensional points; and
   projecting the target three-dimensional contour points from the three-dimensional coordinate system to the two-dimensional coordinate system, to obtain target two-dimensional contour points, so as to determine the target polygon according to the target two-dimensional contour points.

6. The method according to claim 2, further comprising:
   obtaining a second three-dimensional image of the target object in the three-dimensional coordinate system, and the target object comprising a target circular plane;

determining a second target circle and a second center coordinate value of a second target center of the second target circle in the second target three-dimensional image;

determining a first distance between the first target center and the first image capture device that captures the first target three-dimensional image;

determining a second distance between the second target center and the first image capture device that captures the second target three-dimensional image; and determining a target center coordinate value of the target circular plane of the target object according to the first distance, the second distance, the first target center coordinate value, and the second target center coordinate value.

7. The method according to claim 6, further comprising:
determining a first radius of the first target circle and a second radius of the second target circle; and
determining a target radius of the target circular plane according to the first distance, the second distance, the first radius, and the second radius.

8. The method according to claim 2, wherein the mapping the first target center from the two-dimensional coordinate system to the three-dimensional coordinate system, to obtain a target coordinate value of the first target center in the target three-dimensional coordinate system comprises:
mapping the first target center from the two-dimensional coordinate system to the three-dimensional coordinate system, to obtain a target mapped point and a coordinate value of the target mapped point;
obtaining a distance between the target mapped point and the three-dimensional contour point of the first target circle; and
using the coordinate value of the target mapped point as the target coordinate value of the first target center in the three-dimensional coordinate system when the distance between the three-dimensional contour point of the first target circle and the target mapped point falls within a predefined range.

9. An electronic device, comprising:
one or more processors; and
a storage apparatus, configured to store one or more programs,
the one or more programs, when executed by the one or more processor, causing the electronic device to implement an image processing method including:
obtaining a depth image of a target object in a three-dimensional coordinate system by using a first image capture device;
obtaining a pose matrix of the first image capture device in the three-dimensional coordinate system;
performing coordinate transformation on the depth image according to the pose matrix of the first image capture device, to obtain a first target three-dimensional image of the target object in the three-dimensional coordinate system;
determining a target plane of the target object in the first three-dimensional image via plane fitting, the target plane comprising target three-dimensional points in the three-dimensional coordinate system;
projecting the target three-dimensional points to a two-dimensional coordinate system defined on the target plane, to obtain target two-dimensional points in the two-dimensional coordinate system;
determining a target polygon and a minimum circumscribed target graphic of the target polygon in the two-dimensional coordinate system according to the target two-dimensional points, wherein the minimum circumscribed target graphic is a target minimum circumscribed circle;
obtaining a first target center of the target minimum circumscribed circle in the two-dimensional coordinate system;
mapping the first target center from the two-dimensional coordinate system to the three-dimensional coordinate system, to obtain a target coordinate value of the first target center in the three-dimensional coordinate system, the target coordinate value being a first center coordinate value of the first target circle in the three-dimensional coordinate system; and
recognizing the target minimum circumscribed circle as a first target circle of the target object in the first target three-dimensional image when an area ratio between the target polygon and the target minimum circumscribed circle is greater than a predefined threshold.

10. The electronic device according to claim 9, wherein the method further comprises:
determining a radius of the first target circle in the three-dimensional coordinate system according to the first center coordinate value and a coordinate value of a three-dimensional contour point of the first target circle.

11. The electronic device according to claim 10, wherein the mapping the first target center from the two-dimensional coordinate system to the three-dimensional coordinate system, to obtain a target coordinate value of the first target center in the three-dimensional coordinate system comprises:
determining a three-dimensional start point in the target three-dimensional points;
mapping the three-dimensional start point from the three-dimensional coordinate system to the two-dimensional coordinate system, to obtain a two-dimensional start point;
obtaining a target distance between the two-dimensional start point and the first target center in the two-dimensional coordinate system;
using a target three-dimensional point adjacent to the three-dimensional start point as a three-dimensional search point, and mapping the three-dimensional search point from the three-dimensional coordinate system to the two-dimensional coordinate system to obtain a two-dimensional search point; and
using a coordinate value of the three-dimensional start point as the target coordinate value when a distance between the two-dimensional search point and the first target center is greater than or equal to the target distance.

12. The electronic device according to claim 11, wherein the mapping the first target center from the two-dimensional coordinate system to the three-dimensional coordinate system, to obtain a target coordinate value of the first target center in the three-dimensional coordinate system further comprises:
determining, when there are two-dimensional search points whose distances to the first target center are less than the target distance, a target two-dimensional search point that has a minimum distance to the first target center in the two-dimensional search points;
updating the target distance by using the distance between the target two-dimensional search point and the first target center, and updating the three-dimensional start point by using a three-dimensional search point corresponding to the target two-dimensional search point;

mapping an updated three-dimensional start point from the three-dimensional coordinate system to the two-dimensional coordinate system, to update the two-dimensional start point; and updating the three-dimensional search point by using a target three-dimensional point adjacent to the updated three-dimensional start point, and mapping an updated three-dimensional search point from the three-dimensional coordinate system to the two-dimensional coordinate system to update the two-dimensional search point.

13. The electronic device according to claim 9, wherein the projecting the target three-dimensional points to a two-dimensional coordinate system defined on the target plane, to obtain target two-dimensional points in the two-dimensional coordinate system comprises:

determining target three-dimensional contour points of the target plane in the target three-dimensional points; and projecting the target three-dimensional contour points from the three-dimensional coordinate system to the two-dimensional coordinate system, to obtain target two-dimensional contour points, so as to determine the target polygon according to the target two-dimensional contour points.

14. The electronic device according to claim 10, wherein the method further comprises:

obtaining a second three-dimensional image of the target object in the three-dimensional coordinate system, and the target object comprising a target circular plane;

determining a second target circle and a second center coordinate value of a second target center of the second target circle in the second target three-dimensional image;

determining a first distance between the first target center and an image capture device that captures the first target three-dimensional image;

determining a second distance between the second target center and the image capture device that captures the second target three-dimensional image; and determining a target center coordinate value of the target circular plane of the target object according to the first distance, the second distance, the first target center coordinate value, and the second target center coordinate value.

15. The electronic device according to claim 14, wherein the method further comprises:

determining a first radius of the first target circle and a second radius of the second target circle; and determining a target radius of the target circular plane according to the first distance, the second distance, the first radius, and the second radius.

16. The electronic device according to claim 10, wherein the mapping the first target center from the two-dimensional coordinate system to the three-dimensional coordinate system, to obtain a target coordinate value of the first target center in the target three-dimensional coordinate system comprises:

mapping the first target center from the two-dimensional coordinate system to the three-dimensional coordinate system, to obtain a target mapped point and a coordinate value of the target mapped point;

obtaining a distance between the target mapped point and the three-dimensional contour point of the first target circle; and using the coordinate value of the target mapped point as the target coordinate value of the first target center in the three-dimensional coordinate system when the distance between the three-dimensional contour point of the first target circle and the target mapped point falls within a predefined range.

17. The electronic device according to claim 9, wherein the first three-dimensional image is obtained by using a depth image; and the obtaining a first three-dimensional image of a target object in a three-dimensional coordinate system comprises:

obtaining the depth image by using a first image capture device;

obtaining a pose matrix of the first image capture device in the three-dimensional coordinate system; and performing coordinate transformation on the depth image according to the pose matrix of the first image capture device, to obtain the first target three-dimensional image.

18. A non-transitory computer-readable storage medium, storing a computer program, the program, when executed by a processor of an electronic device, causes the electronic device to implement an image processing method including:

obtaining a depth image of a target object in a three-dimensional coordinate system by using a first image capture device;

obtaining a pose matrix of the first image capture device in the three-dimensional coordinate system;

performing coordinate transformation on the depth image according to the pose matrix of the first image capture device, to obtain a first target three-dimensional image of the target object in the three-dimensional coordinate system;

determining a target plane of the target object in the first three-dimensional image via plane fitting, the target plane comprising target three-dimensional points in the three-dimensional coordinate system;

projecting the target three-dimensional points to a two-dimensional coordinate system defined on the target plane, to obtain target two-dimensional points in the two-dimensional coordinate system;

determining a target polygon and a minimum circumscribed target graphic of the target polygon in the two-dimensional coordinate system according to the target two-dimensional points, wherein the minimum circumscribed target graphic is a target minimum circumscribed circle;

obtaining a first target center of the target minimum circumscribed circle in the two-dimensional coordinate system:

mapping the first target center from the two-dimensional coordinate system to the three-dimensional coordinate system, to obtain a target coordinate value of the first target center in the three-dimensional coordinate system, the target coordinate value being a first center coordinate value of the first target circle in the three-dimensional coordinate system; and recognizing the target minimum circumscribed circle as a first target circle of the target object in the first target three-dimensional image when an area ratio between the target polygon and the target minimum circumscribed circle is greater than a predefined threshold.

19. The non-transitory computer-readable storage medium according to claim 18, wherein the method further comprises:

determining a radius of the first target circle in the three-dimensional coordinate system according to the first center coordinate value and a coordinate value of a three-dimensional contour point of the first target circle.

\* \* \* \* \*